(12) United States Patent
Saito

(10) Patent No.: US 8,174,725 B2
(45) Date of Patent: May 8, 2012

(54) IMAGE FORMING APPARATUS AND IMAGE FORMING METHOD

(75) Inventor: Daijiro Saito, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 778 days.

(21) Appl. No.: 12/357,825

(22) Filed: Jan. 22, 2009

(65) Prior Publication Data

US 2009/0185207 A1    Jul. 23, 2009

(30) Foreign Application Priority Data

Jan. 23, 2008  (JP) ................................. 2008-012643

(51) Int. Cl.
*G06F 15/00* (2006.01)
*G06K 1/00* (2006.01)
*G06K 15/02* (2006.01)
*G06K 15/10* (2006.01)

(52) U.S. Cl. .......................................... 358/1.2; 358/1.5
(58) Field of Classification Search .................. None
See application file for complete search history.

(56) References Cited

U.S. PATENT DOCUMENTS 6,256,133 B1 *  7/2001  Suzuki et al. .............. 359/207.1
7,589,846 B2 *  9/2009  Yoshida ....................... 358/1.13

FOREIGN PATENT DOCUMENTS

| JP | 5-275988 A | 10/1993 |
| JP | 2000-198235 A | 7/2000 |
| JP | 2000-246959 A | 9/2000 |
| JP | 2004-347842 | 12/2004 |
| JP | 2005-186337 A | 7/2005 |

* cited by examiner

*Primary Examiner* — Douglas Tran
(74) *Attorney, Agent, or Firm* — Buchanan Ingersoll & Rooney PC

(57) ABSTRACT

An image forming apparatus comprises a signal generator generating a clock signal associated with image forming in a main-scanning direction, an image forming unit including a write unit performing the image forming in the main-scanning direction on a paper relatively moving in a sub-scanning direction, in synchronization with the clock signal generated at the signal generator, an image processor converting input image data into data for driving the write unit, a magnification setting unit setting a magnification of an image in the main-scanning direction associated with a position of the image in the sub-scanning direction, a controller controlling to generate the clock signal of a frequency corresponding to a relative position in the sub-scanning direction on the basis of the magnification set at the magnification setting unit when the write unit performs the image forming on the basis of the data for driving converted at the image processor.

14 Claims, 17 Drawing Sheets

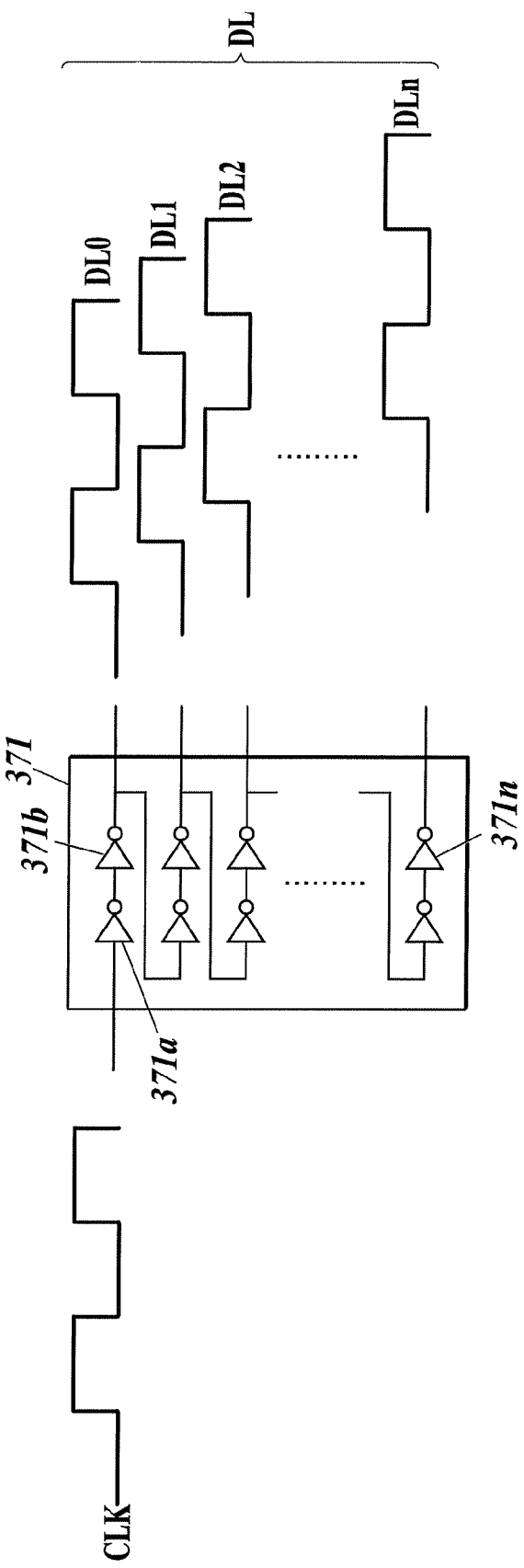

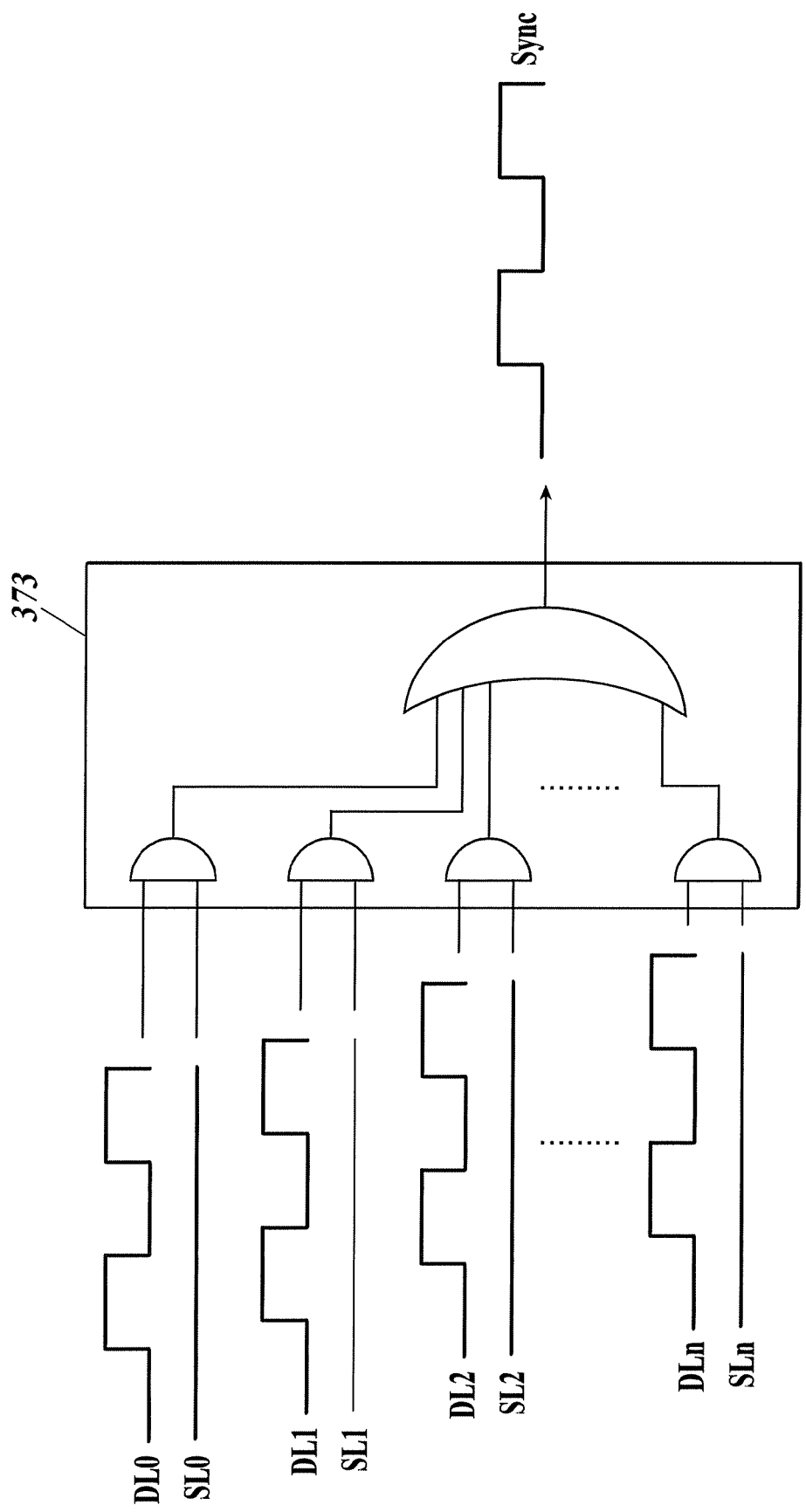

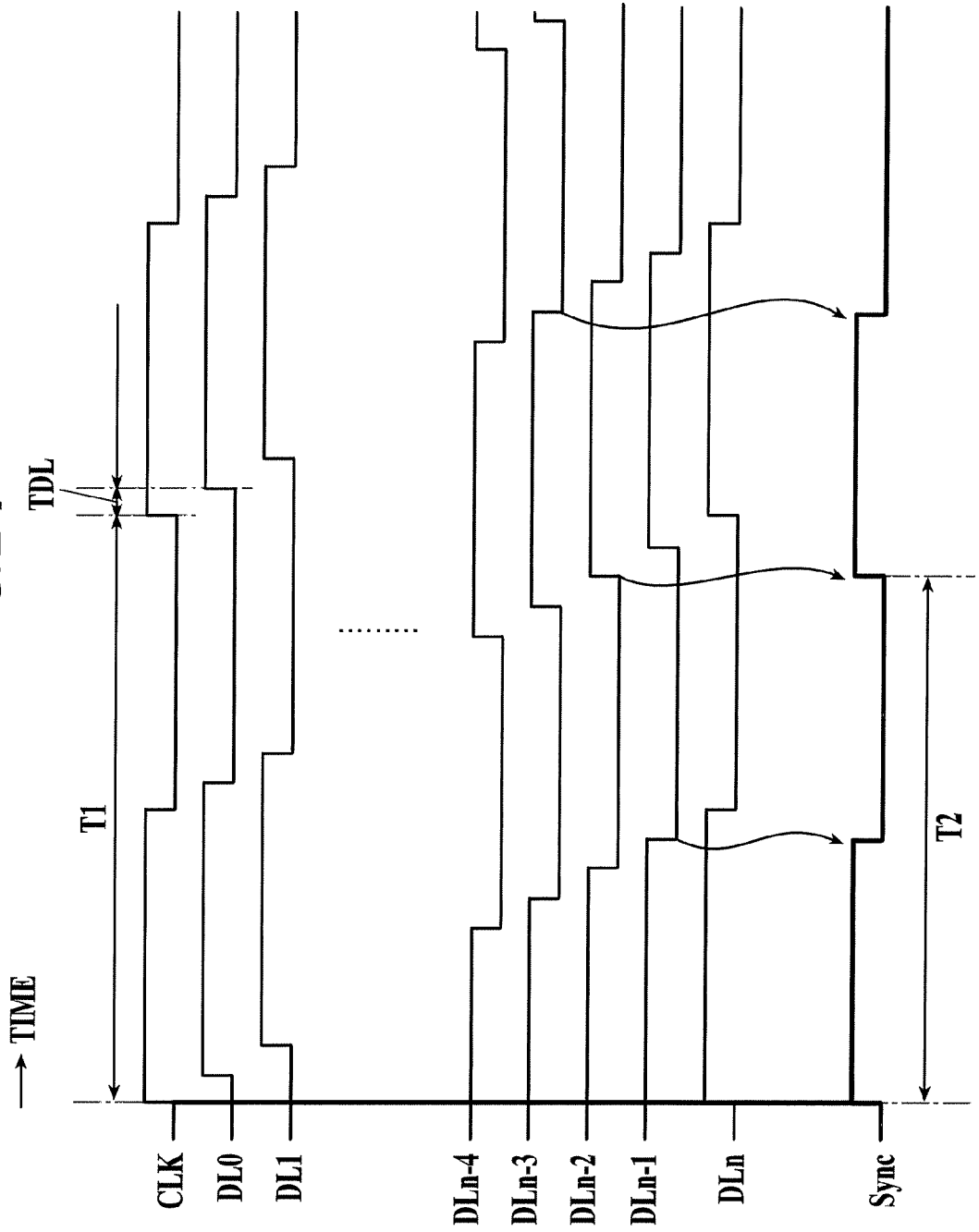

IMAGE FORMING APPARATUS AND IMAGE FORMING METHOD

BACKGROUND OF THE INVENTION

1. Field of the Invention

The present invention relates to an image forming apparatus and an image forming method.

2. Description of the Related Art

A related image forming apparatus forms an electrostatic latent image on a photosensitive drum using a write optical system including a laser diode (LD) and a polygon mirror on the basis of input image data, transfers a toner image formed by attaching toner on the electrostatic latent image onto a recording medium (referred to as a "paper" hereinafter) such as a paper, and thermally fixes the same, thereby forming an image.

In this image forming apparatus, as a method for transforming an image to be formed on a paper with respect to an image associated with an input image data, a method for performing an image processing such as rotation on input image data, or a method for modulating a dot clock for forming one pixel on a paper in a write optical system is known in the art.

For example, as an image processing for controlling an image to be formed on a rear side with respect to a front side in an image forming apparatus, rotating a similar type image is disclosed (Japanese Patent Application Laid-Open (JP-A) NO. 2005-186337). Also, a technique of modulating a dot clock using digital delay is disclosed JP-A NO. H5-275988). Also, a technique of controlling a dot clock frequency in order to control horizontal magnification between colors is disclosed (JP-A NO. 2000-198235, and JP-A NO. 2000-246959).

SUMMARY OF THE INVENTION

The above image forming apparatuses include an apparatus capable of forming an image on both sides of a paper (that is, having a double side mode). Accordingly, the apparatus performs an image forming operation on a rear side as well as a front side. In case of forming an image on both sides of a paper as described above, it is known that the paper is deformed by thermal fixing when an image is formed on one side.

The deformation of the paper by the thermal fixing is remarkable when the thickness of the paper is large, and is gradually resolved when the paper absorbs moisture among air after image forming is completed. Also, in a structure where thermal fixing is performed by pressing a roller having a heater on a roller conveying a paper, since a difference is generated to a shrinkage rate of a main-scanning direction at the position in a sub-scanning direction (conveying direction) of a paper, the paper is deformed in a trapezoid.

Accordingly, in case of forming an image on both sides of a paper, it is required to perform a fine transformation process in a pixel unit depending on a use circumstance. Particularly, in case of performing image forming on both sides, since image forming is performed on a rear side before deformation by thermal shrinkage is resolved, it is required to perform a fine transformation process as a measure against thermal shrinkage. For example, it is required to finely reduce an image on a rear side with respect to a front side and form the reduced image.

However, in the above related art, a dot clock when an image is formed on a rear side with respect to a front side is uniformly modulated, so that entire one sheet of image can be uniformly magnified at the same magnification, but it is not impossible to change a magnification in a main-scanning direction at the position in a sub-scanning direction. Accordingly, the related art cannot properly process a case where a paper is deformed in a trapezoidal shape by thermal fixing.

The present invention has been made in view of the above-mentioned problems, and a purpose thereof is to control a magnification of a main-scanning direction at the position in a sub-scanning direction to form an image.

In first aspect of the present invention, there is provided an image forming apparatus including: a signal generator generating a clock signal associated with image forming in a main-scanning direction; an image forming unit including a write unit performing the image forming in the main-scanning direction on a paper relatively moving in a sub-scanning direction in synchronization with the clock signal generated at the signal generator; an image processor converting input image data into data for driving the write unit; a magnification setting unit setting a magnification of an image in the main-scanning direction associated with a position in the image in the sub-scanning direction to be used when the image is formed on the paper; and a controller controlling to generate the clock signal of a frequency depending on a relative position in the sub-scanning direction on the basis of the magnification set at the magnification setting unit when the write unit performs the image forming on the basis of the data for driving converted at the image processor.

According to the first aspect of the present invention, while the write unit performs image forming, a clock signal associated with image forming in the main-scanning direction may be generated depending on the relative position in the sub-scanning direction on the basis of the set magnification, so that a magnification in the main-scanning direction can be controlled at the position in the sub-scanning direction and an image may be formed.

The magnification setting unit may set a first magnification, which is a magnification of the image in the main-scanning direction on one position of the image in the sub-scanning direction, and a second magnification, which is a magnification of the image in the main-scanning direction on another position of the image in the sub-scanning direction, and the controller may calculate magnifications of the image in the main-scanning direction with respect to a plurality of positions of the image in the sub-scanning direction on the basis of the first and second magnifications set at the magnification setting unit, and perform a control operation on the basis of the calculated magnifications.

According to the present invention, it may be possible to calculate magnifications of the image in the main-scanning direction with respect to a plurality of positions of the sub-scanning direction of the image using the first magnification, which is the magnification in the main-scanning direction of the image on the one position in the sub-scanning direction of the image, and the second magnification, which is the magnification in the main-scanning direction of the image on another position of the sub-scanning direction of the image, set at the magnification setting unit, so that the image may be formed by controlling the magnification in the main-scanning direction on the position of the sub-scanning direction.

The magnification setting unit may set a magnification of the image in the main-scanning direction on one position of the image in the sub-scanning direction, and amount of change in the magnification corresponding to amount of change in the position of the image in the sub-scanning direction, and the controller may calculate magnifications of the image in the main-scanning direction with respect to a plurality of positions of the image in the sub-scanning direction on the basis of the magnification and the amount of change in the magnification set at the magnification setting unit, and perform a control operation on the basis of the calculated magnifications.

According to the present invention, it may be possible to calculate magnifications of the image in the main-scanning direction with respect to the plurality of positions of the image in the sub-scanning direction using the magnification of the image in the main-scanning direction on one position of the image in the sub-scanning direction, and amount of change in the magnification corresponding to amount of change in the position of the image in the sub-scanning direction, set at the magnification setting unit, so that the image may be formed by controlling the magnification in the main-scanning direction on the position of the sub-scanning direction.

The image forming apparatus may further include a setting unit receiving a setting input from an operator, and the setting at the magnification setting unit may be performed on the basis of the setting input from the setting unit.

According to the present invention, it may be possible to set a magnification of the magnification setting unit using the setting input from the operator.

The image forming apparatus may further include a first memory unit storing setting information for each kind of paper, and the setting at the magnification setting unit may be performed by reading setting for each kind of paper from the first memory unit.

According to the present invention, it may be possible to read the setting information for each kind of paper from the first memory unit to perform the setting at the magnification setting unit.

The image forming apparatus may further include a conveying unit conveying a paper from a plurality of paper trays to the write unit, and a second memory unit storing setting information for each of the plurality of paper trays, and the setting at the magnification setting unit may be performed by reading setting for each paper tray from the second memory unit.

According to the present invention, it may be possible to read the setting information for each of the plurality of paper trays from the second memory unit to perform the setting at the magnification setting unit.

The image forming apparatus may further include a third memory unit storing setting information of each image forming side of the paper, and the setting at the magnification setting unit may be performed by reading the setting for each image forming side from the third memory unit.

According to the present invention, it may be possible to read the setting information for each image forming side of the paper from the third memory unit to perform the setting at the magnification setting unit.

In a second aspect of the present invention, there is provided an image forming method in an image forming apparatus including a signal generator generating a clock signal associated with image forming in a main-scanning direction, and a write unit performing image forming in the main-scanning direction on a paper relatively moving in a sub-scanning direction, in synchronization with the clock signal generated at the signal generator, the method including: setting a magnification of an image in the main-scanning direction associated with a position of the image in the sub-scanning direction to be used when the image is formed on the paper; and generating a clock signal of a frequency corresponding to a relative position in the sub-scanning direction on the basis of the set magnification when performing, at the write unit, the image forming to perform the image forming.

According to the second aspect of the present invention, while the write unit performs image forming, a clock signal associated with image forming in the main-scanning direction may be generated depending on the relative position of the sub-scanning direction on the basis of the set magnification, so that a magnification in the main-scanning direction can be controlled at the position of the sub-scanning direction and an image may be formed.

The image forming method may further include: setting a first magnification, which is a magnification of the image in the main-scanning direction on one position of the image in the sub-scanning direction, and a second magnification, which is a magnification of the image in the main-scanning direction on another position of the image in the sub-scanning direction; calculating magnifications of the image in the main-scanning direction with respect to a plurality of positions of the image in the sub-scanning direction on the basis of the set first and second magnifications; and performing the image forming on the basis of the calculated magnifications.

According to the present invention, it may be possible to calculate magnifications of the image in the main-scanning direction with respect to the plurality of positions of the image in the sub-scanning direction using the set first magnification, which is the magnification in the main-scanning direction of the image on the one position of the sub-scanning direction of the image, and the set second magnification, which is the magnification in the main-scanning direction of the image on another position of the image in the sub-scanning direction, so that the image may be formed by controlling the magnification in the main-scanning direction on the position of the sub-scanning direction.

The image forming method may further include: setting a magnification of the image in the main-scanning direction on one position of the image in the sub-scanning direction, and amount of change in the magnification corresponding to amount of change in the position of the image in the sub-scanning direction; calculating magnifications of the image in the main-scanning direction with respect to a plurality of positions of the image in the sub-scanning direction on the basis of the set magnification and the set change in the magnification; and performing the image forming on the basis of the calculated magnifications.

According to the present invention, it may be possible to calculate magnifications of the image in the main-scanning direction with respect to the plurality of positions of the image in the sub-scanning direction using the set magnification of the image in the main-scanning direction on one position of the image in the sub-scanning direction, and the set change in the magnification corresponding to the amount of change in the position of the image in the sub-scanning direction, so that the image may be formed by controlling the magnification in the main-scanning direction on the position of the sub-scanning direction.

The image forming apparatus may further include a setting unit receiving a setting input from an operator, and the setting may be performed on the basis of the setting input from the setting unit.

According to the present invention, it may be possible to set the magnification using the setting input from the operator.

The image forming apparatus may further include a first memory unit storing setting information for each kind of paper, and the setting may be performed by reading setting for each kind of paper from the first memory unit.

According to the present invention, it may be possible to perform the setting by reading the setting information for each kind of paper from the first memory unit.

The image forming apparatus may further include a conveying unit conveying a paper from a plurality of paper trays to the write unit, and a second memory unit storing setting information of each of the plurality of paper trays, and the setting may be performed by reading setting of each paper tray from the second memory unit.

According to the present invention, it may be possible to perform the setting by reading the setting information of each paper tray from the second memory unit.

The image forming apparatus may further include a third memory unit storing setting information for each image forming side of the paper, and the setting may be performed by reading setting of each image forming side from the third memory unit.

According to the present invention, it may be possible to perform the setting by reading the setting information of each image forming side of the paper from the third memory unit.

BRIEF DESCRIPTION OF THE DRAWINGS

The above and other objects, advantages and features of the present invention will be more apparent from the following description of certain preferred embodiments taken in conjunction with the accompanying drawings. The following description of the embodiments is not intended to limit the invention.

FIG. 11 is a conceptual view illustrating the construction of a delay chain unit and the outline of input/output signals;

FIG. 13 is a conceptual view illustrating the construction of a selector and the outline of input/output signals;

FIG. 14 is a timing chart of a signal associated with a signal generator;

DESCRIPTION OF THE PREFERRED EMBODIMENTS

The embodiments of the invention will be now described herein with reference to drawings, but the invention is not limited thereto. The embodiments of the invention only exemplify the best mode of carrying out the invention, and the applications and terms used in the following description are not limited to those described herein.

Figure 1:
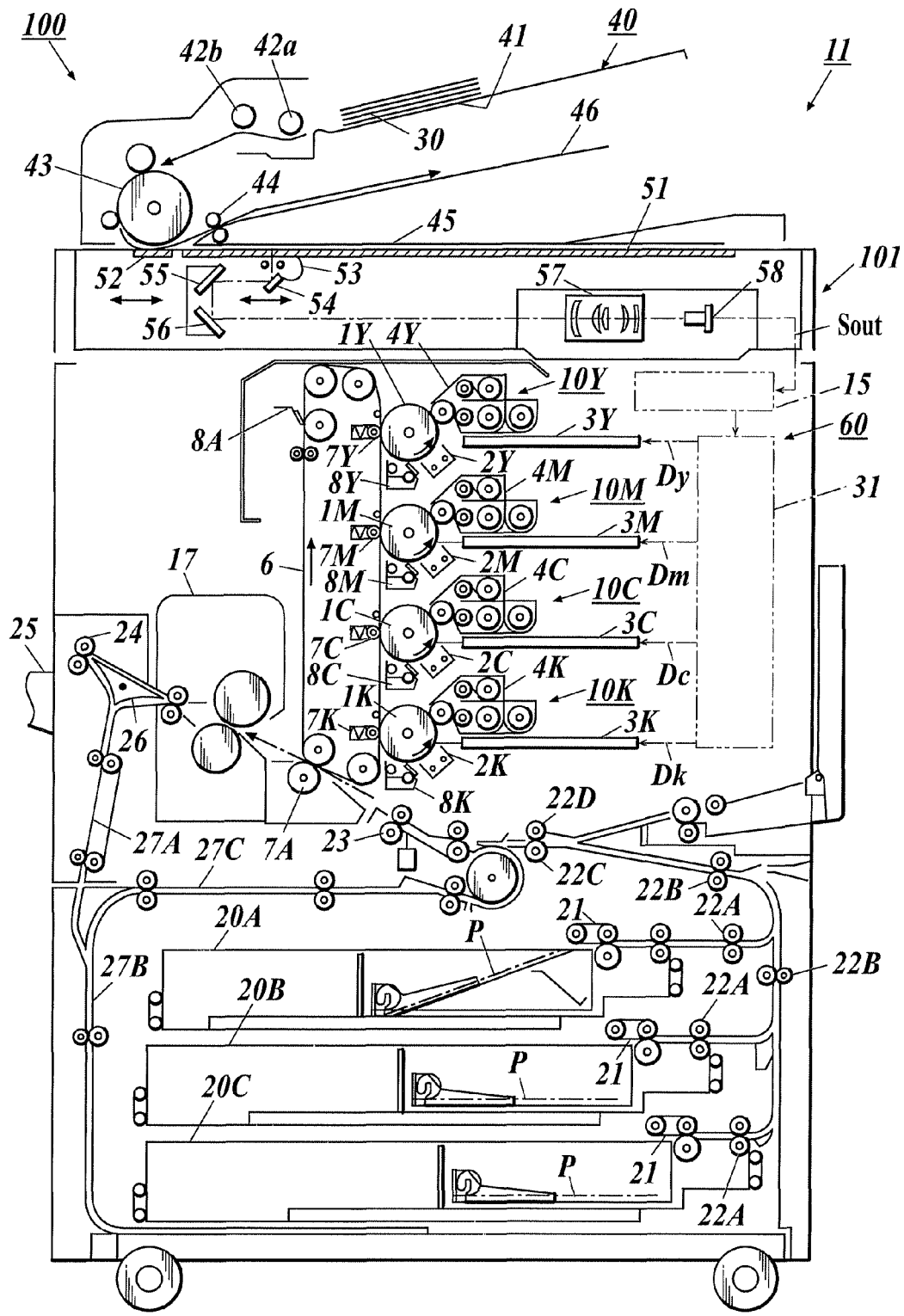
FIG. 1 is a conceptual view illustrating the inner construction of a color copier according to the present invention.

First, the construction of a color copier, which is an example of an image forming apparatus forming a color image on a paper, is described with reference to FIGS. 1 to 3. FIG. 1 illustrates the inner construction of a color copier 100, FIG. 2 exemplifies the construction of an image forming unit 10 in the color copier 100, and FIG. 3 exemplifies the construction of a write unit 3 in the color copier 100.

As illustrated in FIG. 1, the color copier 100 forms an image by allowing a color to overlap on a paper on the basis of image information obtained by reading a color image formed on a document 30 or image information input from a different information apparatus through communication.

Also, an embodiment exemplifies the color copier 100, which is a multi function printer (MFP) having a so-called copy function or printer function. However, an image forming apparatus forming an image on a paper can be a facsimile apparatus, a single copier or printer, and an MFP forming a monochrome image, and is not limited specifically.

The color copier 100 has a copier main body 101. An image input unit for color 11 and an automatic document feeder (ADF) 40 are disposed and installed on the upper portion of the copier main body 101. During an ADF mode, the ADF 40 operates to allow one or a plurality of documents 30 to be automatically fed. Here, the ADF mode is an operating mode allowing the documents 30 stacked on the ADF 40 to be automatically fed, so that the documents are automatically read.

The ADF 40 includes a document stacking unit 41, a roller 42a, a roller 42b, a roller 43, a conveying roller 44, and a discharge tray 46. One or a plurality of documents 30 are stacked on the document stacking unit 41. The roller 42a and the roller 42b are installed in the downstream of the document stacking unit 41. When the ADF mode is selected, the document 30 sent from the document stacking unit 41 is conveyed such that the document 30 rotates in a U-shape by the roller 43 in the downstream. Also, when the ADF mode is selected, a recording side of the document 30 is stacked on the document stacking unit 41 to face upward.

Also, the image input unit 11 operates to read a color image formed on the document 30. As the image input unit 11, a slit scan type scanner for color is used for example. The image input unit 11 includes an image sensor 58 arranged in an array. For example, during the ADF mode, when the document 30 is reversed in a U-shape by the roller 43, the image input unit 11 reads the surface of the document 30 to output an image read signal Sout. As the image sensor 58, a 3-line color charged coupled device (CCD) image pickup device is used for example.

The image sensor 58 includes three read sensors for detecting red(R), green (G), and blue (B) where a plurality of light receiving devices are arranged in a main-scanning direction. The image sensor 58 decomposes a pixel at a different position of a sub-scanning direction perpendicular to the main-scanning direction to simultaneously read light information of R color, green color, and cyan (C) color.

The document 30 read by the image input unit 11 is conveyed by the conveying roller 44 and discharged to the discharge tray 46. Also, the image sensor 58 outputs an image read signal of RGB colors obtained by reading the document 30 during a platen mode. Here, the platen mode is an operating mode of scanning an optical driving system onto the document 30 stacked on a platen glass to automatically read an image on the document.

The image input unit 11 includes a first platen glass 51, a second platen glass 52 (ADF glass), a light source 53, mirrors 54, 55, and 56, an image forming optical unit 57, and an optical driving unit (not shown specifically) besides the image sensor 58. The light source 53 operates to illuminate light onto the document 30. The optical driving unit operates to relatively move the document 30 or the image sensor 58 in the sub-scanning direction. Here, the sub-scanning direction means a direction perpendicular to the main-scanning direction along which the plurality of light receiving devices forming the image sensor 58 are arranged in the main-scanning direction. As described above, the document 30 stacked on the document stacking unit 41 of the ADF 40 is conveyed by the rollers 42a, 42b, and 43, and the conveying roller 44. An image on one side or both sides of the document 30 is scanned and exposed by the optical system of the image input unit 11, and incident light reflecting image reading is read by the image sensor 58.

The image sensor 58 performs photoelectric conversion according to a light amount of the incident light. An image processor 31 is connected to the image sensor 58 through a controller 15. The image processor 31 performs an analog process, analog-to-digital (A/D) conversion, shading correction, an image compression process, and a magnification process on a photoelectric converted analog image read signal, and changes the analog image read signal into digital image data of R color, G color, and B color components. The image processor 31 converts the image data into image data Dy, Dm, Dc, and Dk for yellow (Y), magenta (M), cyan (C), and black (K) colors using three dimensional color information conversion table, and transmits the image data Dy, Dm, Dc, and Dk after the color conversion to write unit 3Y, 3M, 3C, and 3K forming an image forming unit 60.

The copier main body 101 is a so-called tandem type color image forming apparatus. The image forming unit 60 is installed to the copier main body 101. The image forming unit 60 forms a color image on the basis of image data Dy, Dm, Dc, and Dk obtained by reading at the image input unit 11. The image forming unit 60 includes image forming units 10Y, 10M, 10C, and 10K for forming an image on a paper for each color, an intermediate transfer body 6 of an endless shape, and a fixing unit 17 for thermally fixing a toner image formed by transferring the intermediate transfer body 6 onto a paper.

Here, the image forming units 10Y, 10M, 10C, and 10K are described in detail. Also, the plurality of image forming units 10Y, 10M, 10C, and 10K has the same construction with only difference in the color of toner. Therefore, they are simply referred to as the image forming unit 10 hereinafter. Regarding photosensitive drums 1Y, etc. forming the image forming unit 10, an English character behind a number is omitted for convenience.

Figure 2:
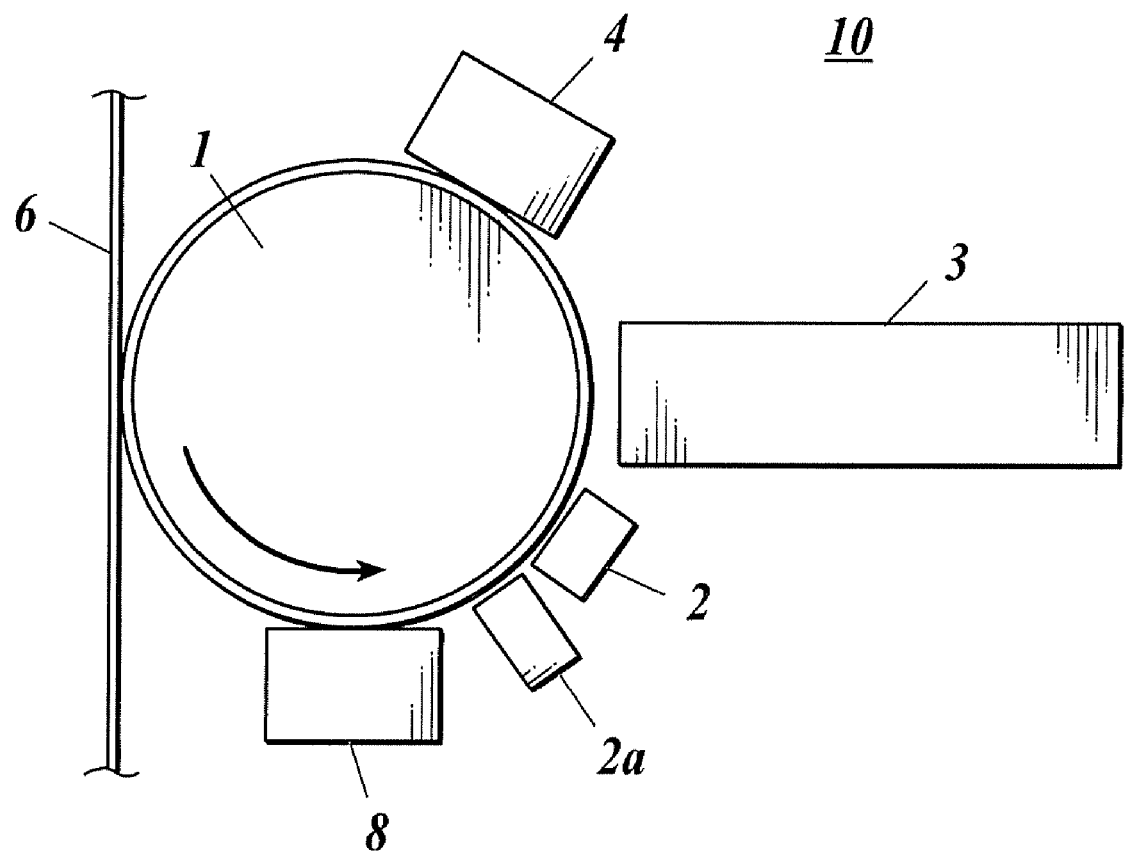
FIG. 2 is a conceptual view illustrating the construction of an image forming unit.

As illustrated in FIG. 2, the image forming unit 10 includes a photosensitive drum 1, a charging unit 2 charging the photosensitive drum 1, the write unit 3 scanning a laser beam onto the photosensitive drum 1 to form an electrostatic latent image, a developer 4 attaching toner onto the photosensitive drum 1, a cleaner 8 cleaning toner remaining on the neighboring surface of the photosensitive drum 1, and an removing unit 2a removing static electricity on the surface of the photosensitive drum 1.

The write unit 3 illuminates a laser beam to scan a scanning line on the photosensitive drum 1 in the main-scanning direction to perform a write operation. As illustrated in FIG. 3, the write unit 3 includes a light source unit 300, a slit 302, a cylindrical lens 303, a polygon mirror 304, an fθ lens 305, a cylindrical lens 306, a mirror 307, and a light receiving unit 308.

The light source unit 300 includes a laser light source LD emitting light in response to a control signal output from the controller 15 in synchronization with a clock signal output from the signal generator 37 which will be described later, and a collimator lens 301 changing laser light emitted from the laser light source LD into parallel light.

Emitting of the laser beam from the light source unit 300 to the photosensitive drum 1 is performed as follows. First, transmission of the laser beam emitted from the light source unit 300 is limited by the slit 302 for fixing the form of a beam spot on the photosensitive drum 1.

Subsequently, the laser beam that has passed through the slit 302 is focused on a mirror surface of the polygon mirror 304 in rotation by the cylindrical lens 303, and deflected by being reflected by the mirror surface. The reflective mirror surface of the polygon mirror 304 can be considered as a virtual light source. Since a distance from this virtual light source to the surface of the photosensitive drum 1 is different depending on a direction of the reflective mirror surface, an influence on a main-scanning velocity of the laser beam emitted from the virtual light source is corrected by the fθ lens 305.

The laser beam emitted from the fθ lens 305 is focused on the photosensitive drum 1 by the cylindrical lens 306. The laser beam focused on the photosensitive drum 1 is scanned in the main-scanning direction of the photosensitive drum 1 accompanied with rotation of the polygon mirror 304. Also, a portion of the laser beam scanned with rotation of the polygon mirror 304 is reflected by the mirror 307, and detected by the light receiving unit 308. That is, the detection of the laser beam at the light receiving unit 308 makes possible one time of writing in the main-scanning direction of the photosensitive drum 1 and detection of the write start timing.

As described above, the color copier 100 including the write unit 3 is configured to perform scanning exposure in the main-scanning direction using rotation of the polygon mirror 304, and form an image by rotating and moving the photosensitive drum 1 in the sub-scanning direction.

Figure 3:
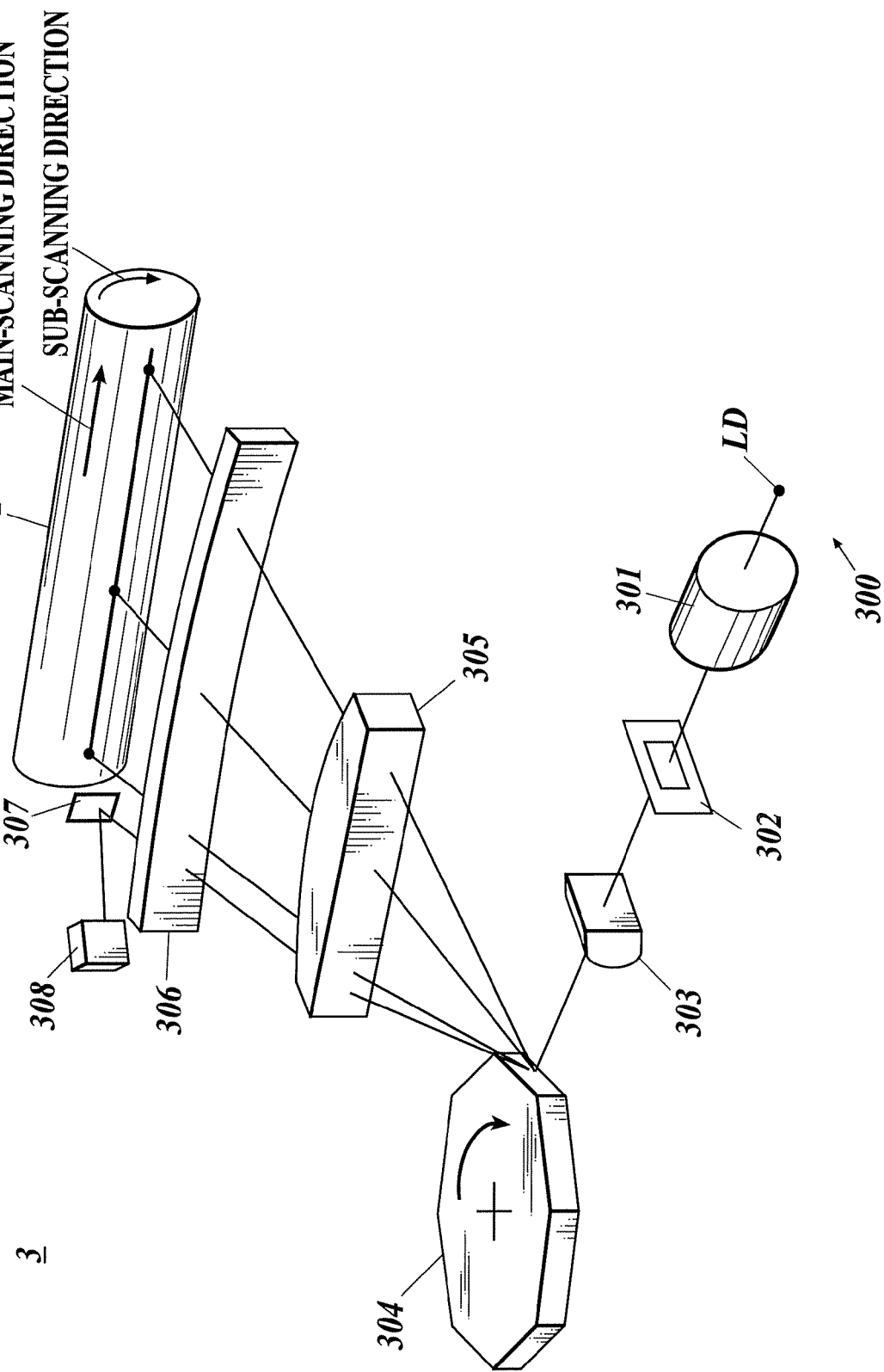
FIG. 3 is a conceptual view illustrating the construction of a write unit.

Also, in the construction exemplified in FIG. 3, the polygon mirror 304 having eight mirror surfaces is used in order to scan a laser beam that has passed through the slit 302 in the main-scanning direction, but the number of mirror surfaces is not limited thereto. Also, though a writing operation in the main-scanning direction of the photosensitive drum 1 using laser light emitted from one laser light source LD in the present embodiment is exemplified, the writing operation in the main-scanning direction can be performed using parallel light obtained by changing, at the collimator lens 301, laser light emitted from a plurality of laser light sources.

After an electrostatic latent image is formed on the photosensitive drum 1 by the write unit 3, the image forming unit 10 performs a developing operation using a developer 4. The developing operation by the developer 4 is performed using an inversion phenomenon that a developing bias overlapping an AC voltage is applied to a DC voltage, which is the same polarity (for example, a negative polarity) as a toner polarity in use. A toner image developed on the photosensitive drum 1 is wound on a plurality of rollers, and transferred to the intermediate transfer body 6 rotatably supported.

That is, the color copier 100 sequentially transfers toner images of Y color, M color, C color, and K color to the intermediate transfer body 6 using the image forming units 10Y, 10M, 10C, and 10K.

Here, the outline of an image forming process at the color copier 100 is described with reference to FIG. 1. Images of respective colors formed by the image forming units 10Y, 10M, 10C, and 10K are sequentially transferred onto the intermediate transfer body 6 performing a rotational motion by first transfer rollers 7Y, 7M, 7C, and 7K to which a first transfer bias (not shown specifically), which is an opposite polarity (for example, a positive polarity) to that of toner in use, is applied, so that a color image (color toner image) synthesized by overlapping colors is formed (first transfer).

Also, paper trays 20A, 20B, and 20C storing a paper P to be conveyed to the image forming unit 60 are installed in the lower portion of the image forming unit 60. A paper P stored in the paper tray 20A is fed by a delivery roller 21 and a feeding roller 22A installed to the paper tray 20A, and conveyed to a second transfer roller 7A by way of conveying rollers 22B, 22C, and 22D, and a resist roller 23. Here, color images formed on the intermediate transfer body 6 are collectively transferred on one side (front side) of the paper P (second transfer).

The paper P on which the color images have been transferred is thermally fixed by the fixing unit 17, inserted and supported by a discharge roller 24, and stacked on a discharge tray 25 outside a machine. Also, a transfer residual toner remaining on the intermediate transfer body 6 after a transfer operation is removed by a cleaner 8A. The color copier 100 forms an image on one side of the paper P using the image forming process.

Also, during a double image forming operation, after an image is formed on one side (front side) of a paper P, the paper diverges from a discharge path through which the paper P discharged from the fixing unit 17 is stacked on the discharge tray 25 by a diverging portion 26. Subsequently, the paper P passes through a paper circulating path 27A, and is reversed such that the front side and the rear side are reversed by a reversion conveying path 27B, which is a re-feeding mechanism (automatic duplex unit (ADU) mechanism), and passes through a re-feeding conveying unit 27C to join with the transfer path from the conveying roller 22D. This converted conveyed paper P passes through the resist roller 23, and is conveyed to the second transfer roller 7A again. Color images are collectively transferred on other side (rear side) of the paper P, and the paper P is then stacked on the discharge tray 25 outside a machine.

As the paper P on which the image forming process is performed, a light paper of about 52.3 to 63.9 kg/m$^2$ (1,000 sheets), a general paper of about 64.0 to 81.4 kg/m$^2$ (1,000 sheets), a heavy paper of about 83.0 to 130.0 kg/m$^2$ (1,000 sheets), or a super heavy paper of about 150.0 kg/m$^2$ (1,000 sheets) is used. As the thickness (paper thickness) of the paper P, a thickness of about 0.05 to 0.15 mm is used.

Figure 4:
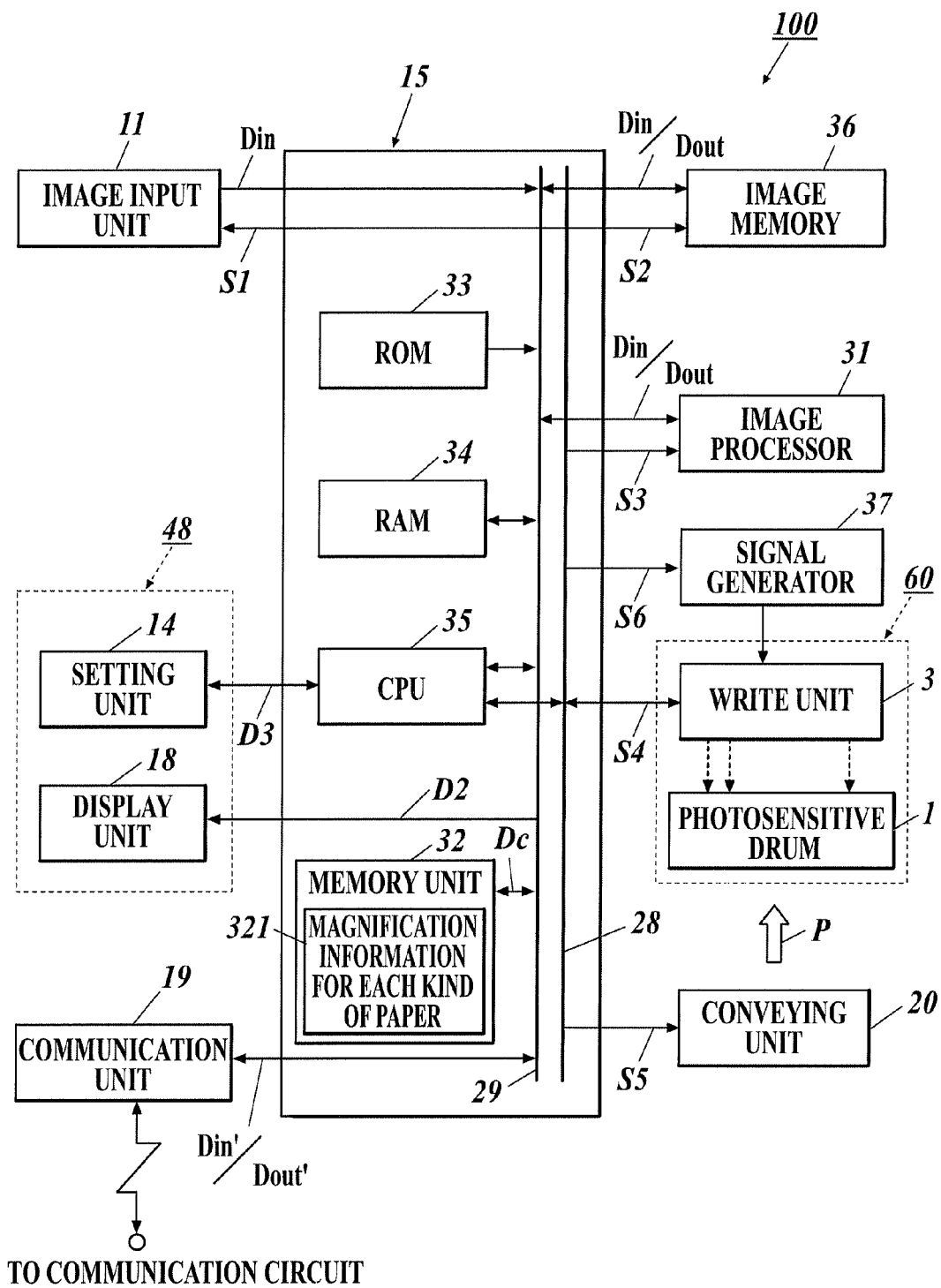
FIG. 4 is a schematic block diagram illustrating the construction of a control system of a color copier.

Next, a control system of the color copier 100 is described with reference to FIG. 4. FIG. 4 schematically illustrates the construction of the control system of the color copier 100.

As illustrated in FIG. 4, the color copier 100 includes the image input unit 11, the controller 15, a communication unit 19, a conveying unit 20, the image processor 31, an image memory 36, the signal generator 37, a manipulation panel 48, and the image forming unit 60.

The controller 15 includes a read only memory (ROM) 33, a central processing unit (CPU) 35, a random access memory (RAM) 34 for work, and a crystal oscillator (not shown specifically). The ROM 33 stores system program data for controlling the entire color copier. The ROM 33 stores unique setting information of the unit such as the number of pixels (resolution) in the main-scanning direction/sub-scanning direction formed on the paper P by the image forming unit 60, or program data executable by the controller 15. The RAM 34 temporarily stores a control command during double mode execution, or provides a storing region for work in an operation process described later. When power is turned on, the CPU 35 reads system program data from the ROM 33 and outputs a control signal to each unit to drive a system, and controls the entire color copier. The crystal oscillator installed to the controller 15 outputs a clock signal of a unique frequency in order to synchronize an operation timing of the entire color copier.

The manipulation panel 48 includes a setting unit 14 formed by a touch panel, and a display unit 18 such as a liquid crystal display (LCD), and displays a manipulation screen and receives a setting input under control of the controller 15. The setting unit 14 is connected to the controller 15, and receives a manipulation input of an image forming condition such as a kind of a paper P on which an image is to be formed, or image forming on one side or both sides using the image forming unit 60, and outputs the image forming condition to the controller 15.

Besides this manipulation, the setting unit 14 can also set an image shape formed on a front side or a rear side by receiving a magnification setting in the main-scanning direction corresponding to the position of the paper P in the sub-scanning direction. Also, the setting unit 14 can receive a manipulation input such as a density setting of an image, selection of a paper size, and a setting of the number of copies.

Also, the setting contents at the manipulation panel 48 are temporarily stored in a work region of the RAM 34 under control of the controller 15, and conserved by updating contents of magnification information for each paper kind 321 of a memory unit 32 described later on the basis of an instruction input reflecting the setting contents.

In this example, systems such as a control bus 28 and a data bus 29 are connected to the CPU 35. The display unit 18 is connected to the data bus 29. The display unit 18 displays a preview image in which the document 30 is reduced on the basis of image data Din obtained by the image input unit 11, or displays a select item associated with an image forming condition on the basis of display data D2 sent from the CPU 35. Also, setting contents of the manipulation panel 48 such as an image forming condition and a kind of a paper P on which an image should be formed are output to the CPU 35 as manipulation data D3.

The memory unit 32 is connected to the CPU 35 through the control bus 28 and the data bus 29. The memory unit 32 stores the magnification information for each paper kind 321, which is table data storing the setting contents of the manipulation panel 48 for each setting item (kind of paper, paper tray, image forming side (rear side/front side)). That is, the memory unit 32 serves as a first memory unit storing setting information for each kind of paper, a second memory unit storing setting information for each of a plurality of paper trays, and a third memory unit storing setting information for each image forming side of a paper.

The image input unit 11 is connected to the control bus 28 and the data bus 29. An analog-to-digital converter (not shown) is installed to the image input unit 11. The image input unit 11 A/D-converts an analog image read signal obtained by reading the document 30 in response to a read control signal S1 from the controller 15. Digital image data Din after the A/D conversion is transmitted to an image memory 36 connected to the control bus 28 and the data bus 29.

The image data Din is stored in the image memory 36 in response to a memory control signal S2. As the image memory 36, a hard disk drive or a semiconductor memory device is used. A read control signal S1 is output from the CPU 35 to the image input unit 11 through the control bus 28. Likewise, a memory control signal S2 is output from the CPU 35 to the image memory 36. The CPU 35 performs a write/read control of data in the image memory 36.

A three-dimensional color information exchange table is stored in advance in a memory (not shown specifically). The image processor 31 converts image data, Dout of a RGB color system read from the image memory 36 into image data Dy, Dm, Dc, and Dk of a YMCK color system in response to an image process control signal S3 from the controller 15.

The image processor 31 supplies image data on a line basis or pixel basis in the main-scanning direction to the write unit 3 of the image forming unit 60. As the image processor 31, a digital signal processor (DSP) or a RAM is used. A work region (line buffer) for supplying image data on a line basis or pixel basis is installed in the RAM, and temporarily stores image-processed line data before supply. Specifically, line data corresponding to image forming of one line portion in the main-scanning direction is stored in a multi-stage.

The signal generator 37 is connected to the control bus 28. The signal generator 37 generates a clock signal associated with image forming in the main-scanning direction at the write unit 3 on the basis of a timing generation control signal S6 and a clock signal of a unique frequency from the controller 15. That is, the signal generator 37 outputs a clock signal associated with image forming in the main-scanning direction using a period and a frequency in response to a control of the controller 15.

The clock signal associated with the image forming in the main-scanning direction is a signal representing an emission timing of the laser light source LD for forming a pixel in the main-scanning direction at the write unit 3. Specifically, one period of a clock signal is a signal corresponding to image forming of one pixel portion.

The write unit 3 scanning light in the main-scanning direction of the photosensitive drum 1 accompanied with rotation of the polygon mirror 304 to perform a writing operation of an image obtains the emission timing of the laser light source LD on the basis of a clock signal associated with the image forming in the main-scanning direction, thereby magnifying the image to be formed in the main-scanning direction depending on modulation of the period and frequency of the clock signal.

Also, the controller 15 performs magnification control of an image to be formed in the main-scanning direction by outputting a timing generation control signal S6 to the signal generator 37 so that the signal generator 37 generates a clock signal where a value that can be obtained by multiplying one period value of a clock signal which is information regarding the period of a clock signal set in advance in the ROM by a magnification becomes one period. The clock signal performs image forming in the main-scanning direction at a magnification of 1×.

The image forming unit 60 is connected to the control bus 28. The image forming unit 60 includes the image forming units 10Y, 10M, 10C, and 10K shown in FIG. 1. Also, only the write unit 3 and the photosensitive drum 1 are shown in FIG. 4. The image forming unit 60 performs a write operation on the photosensitive drum 1 using the write unit 3 on the basis of an image making control signal S4 input through the control bus 28 from the CPU 35, image data read from the image memory 36, and a clock signal associated with image forming in the main-scanning direction output from the signal generator 37, to form an image on a paper P conveyed by the conveying unit 20.

The conveying unit 20 is connected to the control bus 28. The CPU 35 controls conveying of a paper from the paper trays 20A to 20C shown in FIG. 1 using a feeding control signal S5. For example, the conveying unit 20 conveys the paper P stored in one of the paper trays 20A to 20C to the image forming unit 60 in response to a feeding control signal S5 from the controller 15.

The communication unit 19 is connected to the data bus 29. The communication unit 19 is connected to a communication circuit such as a local area network (LAN), and used when communicating with an external computer or printer. For example, when forming and outputting a document image read by the color copier 100 through an external printer, the communication unit 19 transmits image data Dout' to the external printer. Also, the communication function of the communication unit 19 is also used when receiving image data Din' made using an external computer and performing a double-side printing process using the image forming unit 60 under control of the controller 15.

Figure 5:
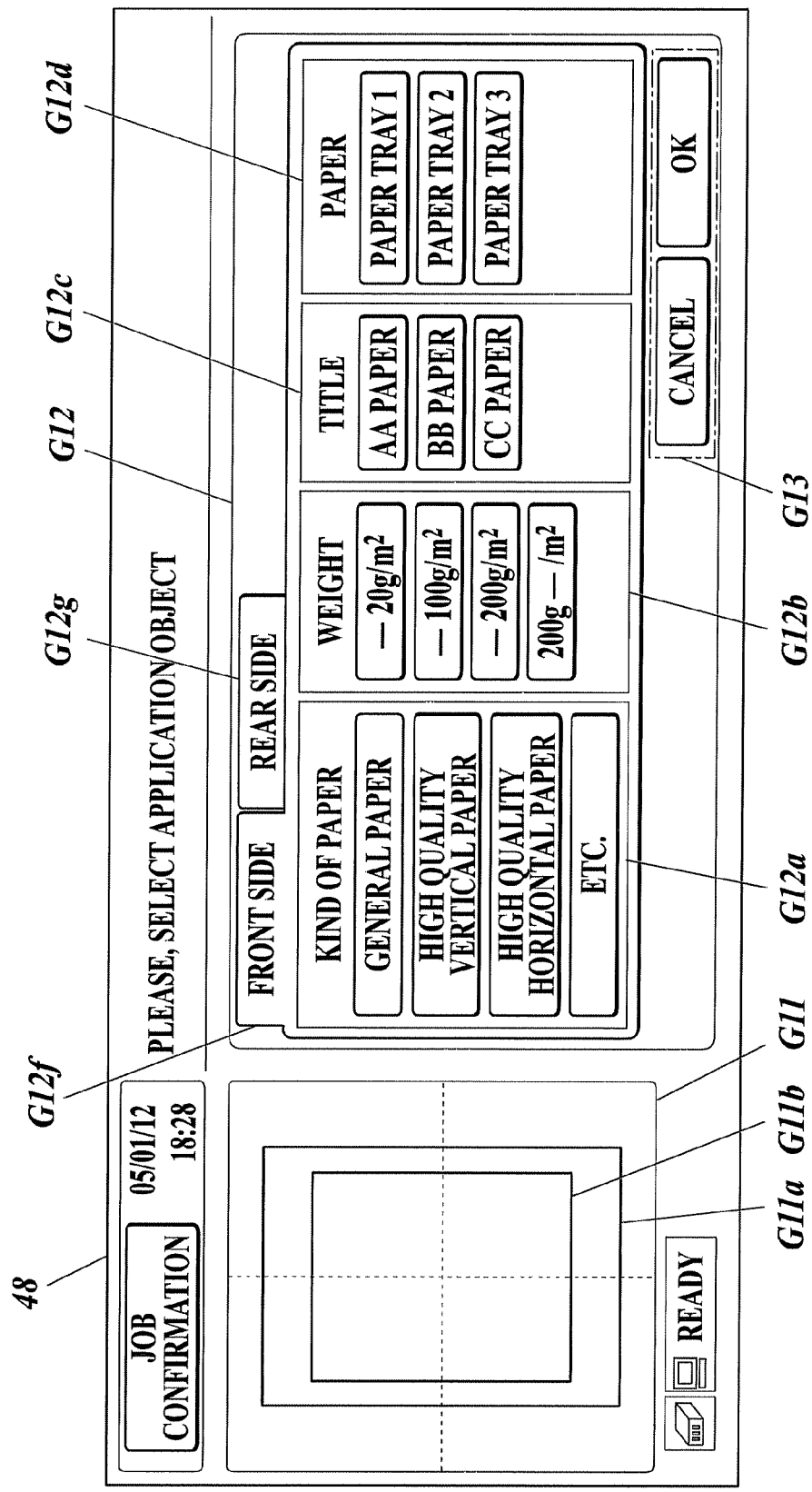
FIG. 5 is a conceptual view exemplifying a setting screen in a manipulation panel.
Figure 6:
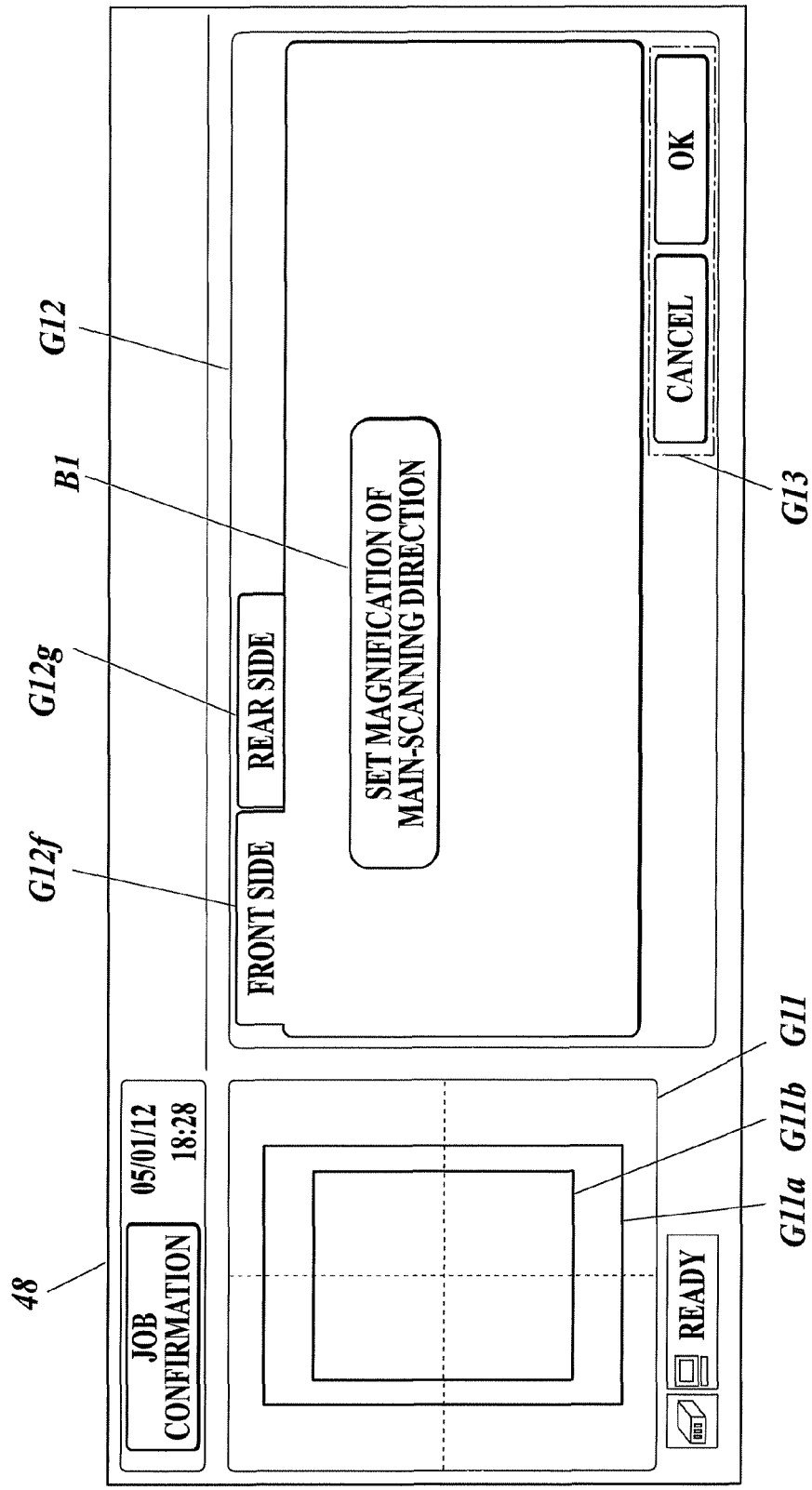
FIG. 6 is a conceptual view exemplifying a setting screen of an image shape in a manipulation panel.
Figure 7:
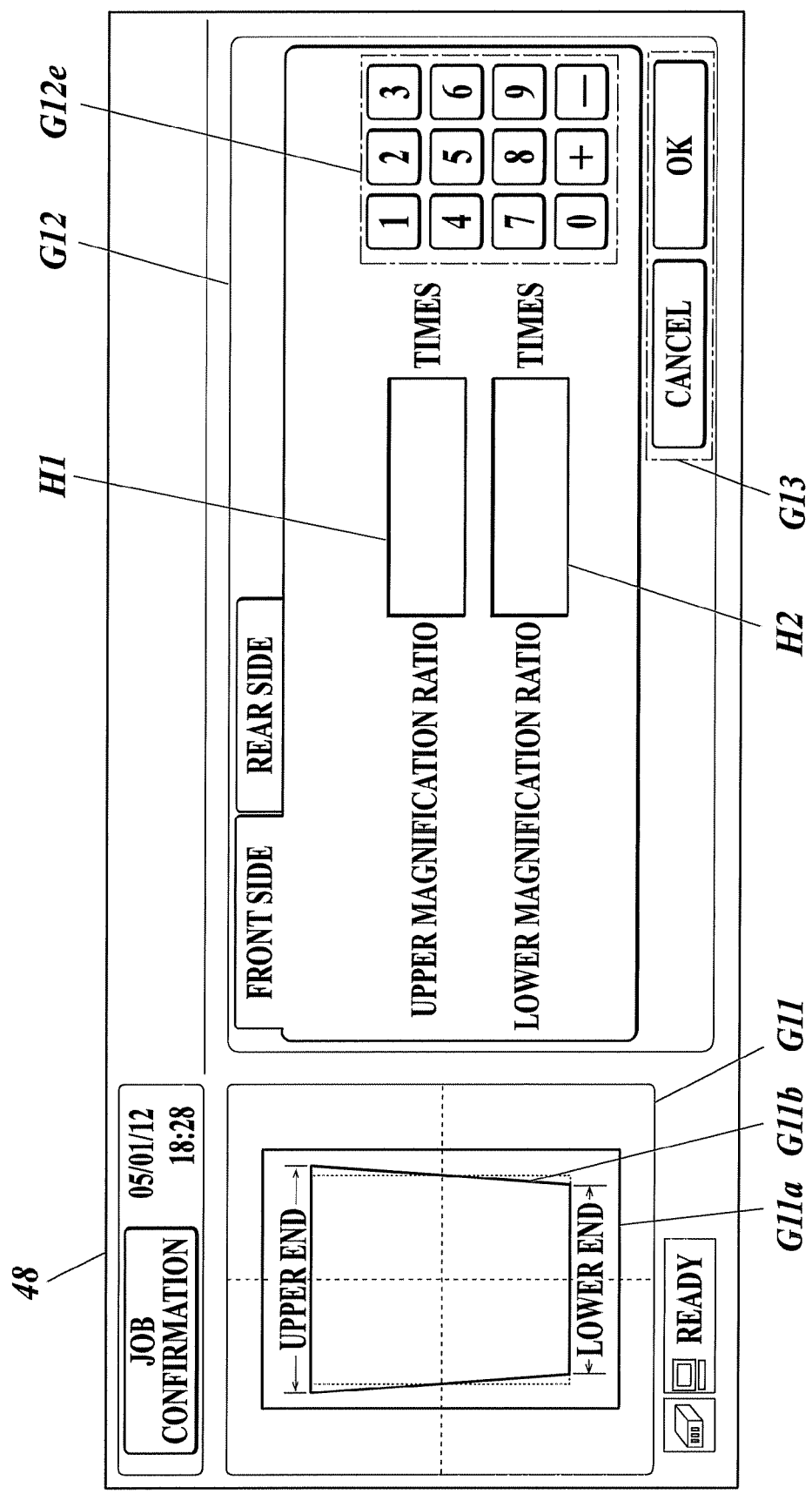
FIG. 7 is a conceptual view exemplifying a setting screen of an image forming magnification in a main-scanning direction in a manipulation panel.
Figure 8:
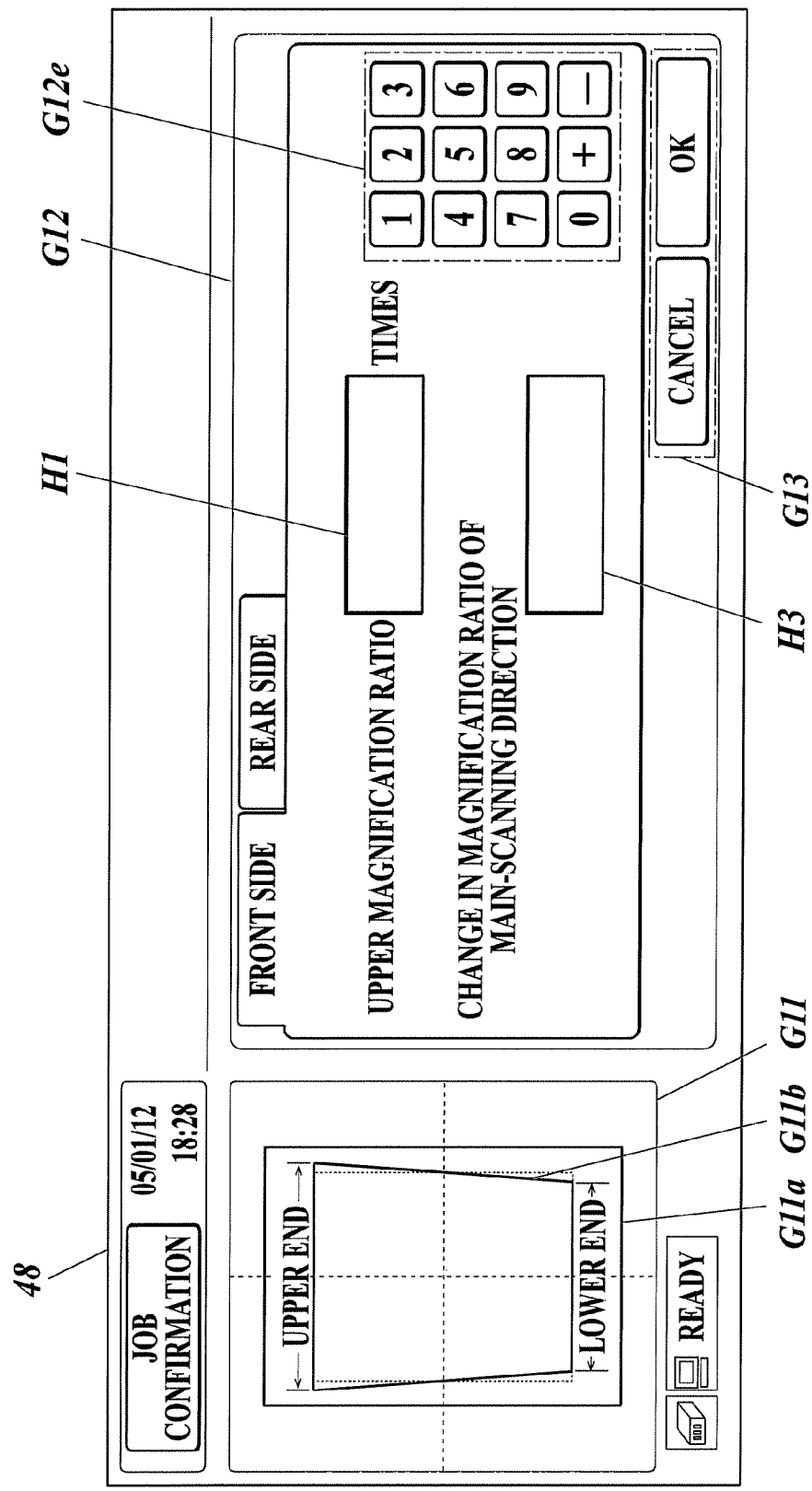
FIG. 8 is a conceptual view exemplifying a setting screen of an image forming magnification in a main-scanning direction in a manipulation panel.

Here, setting, at the manipulation panel 48, the shape of an image to be formed on a front side or a rear side is described with reference to FIGS. 5 to 9. FIG. 5 exemplifies a setting screen of the manipulation panel 48. FIG. 6 exemplifies a setting screen of an image shape in the manipulation panel 48. FIGS. 7 and 8 exemplify a setting screen an image forming magnification in the main-scanning direction in the manipulation panel 48, and FIG. 9 exemplifies a paper transformed in a trapezoidal shape.

As illustrated in FIG. 5, the setting screen of the manipulation panel 48 includes an image information display region G11, a setting instruction input region G12, and a determinate instruction input region G13. The image information display region G11 is a display region schematically exemplifies an image forming status to a paper P. Specifically, a paper image G11a exemplifying a paper side of a paper, or an image forming region image G11b exemplifying an image forming region on the paper side is displayed on the image information display region G11.

The setting instruction input region G12 is a region displaying buttons setting a kind of paper, weight, title, and an image shape formed on the front side or rear side of a paper, or setting status for each paper tray. The setting instruction input region G12 includes an instruction region G12a for each kind of paper, an instruction region G12b for each weight, an instruction region G12c for each title, an instruction region G12d for each discharge tray, an instruction button G12f for each front side, and an instruction button G12g for each rear side.

The instruction region G12a for each kind of paper displays buttons for selecting a kind of a paper such as a "general paper", a "high quality vertical paper", a "high quality horizontal paper", and "etc.", and receives a setting instruction for each kind of paper by reversing the display through selection of one button. Also, the kind of paper can be a kind regarding a size of a paper such as "A4", "A5", etc. as well as a material of a paper, and is not limited specifically.

The instruction region G12b for each weight displays buttons for selecting weight such as "to 20 g/m$^2$", "to 100 g/m$^2$", "to 200 g/m$^2$", and "to 200 g/m$^2$", and receives a setting instruction for each weight by reversing the display through selection of one button.

The instruction region G12c for each title displays buttons for selecting a title such as "AA paper", "BB paper", and "CC paper", and receives a setting instruction for each title by reversing the display through selection of one button.

The instruction region G12d for each discharge tray displays buttons for selecting the paper trays 20A to 20C of the conveying unit 20 such as a "paper tray 1", a "paper tray 2", and a "paper tray 3", and receives a selection instruction for a paper tray to be set by reversing the display through selection of one button. The instruction button G12f for each front side is a button for receiving a setting instruction of a front side, and the instruction button G12g for each rear side is a button for receiving a setting instruction of a rear side.

The determinate instruction input region G13 displays buttons such as "OK" and "cancel", and receives an instruction reflecting setting contents selected on the screen into the magnification information for each paper kind 321, or an instruction clearing setting contents selected on the screen and temporarily stored in the RAM 34.

The color copier 100 can set a paper kind, weight, and a title for each paper tray by receiving a user's manipulation input from the setting unit 14 on the setting screen of the manipulation panel 48.

Subsequent to the setting screen, the manipulation panel 48 displays a screen for setting details of an image shape formed on a front side or a rear side of a paper of paper trays selected from the instruction region G12d for each discharge tray, that is, a screen for setting an image forming magnification in the main-scanning direction for each image forming position in the sub-scanning direction.

Specifically, as illustrated in FIG. 6, the manipulation panel 48 displays the instruction button G12f for each front side, the instruction button G12g for each rear side, instructing front/rear sides, respectively, and a setting instruction button B1 instructing start of magnification setting in the main-scanning direction in the instructed side, with respect to a paper of one of the paper trays selected from the instruction region G12d for each discharge tray. In the case where the setting instruction button B1 is selected, a setting screen for setting an image forming magnification in the main-scanning direction for each image forming position in the sub-scanning direction is displayed on the manipulation panel 48.

The setting screen for setting an image forming magnification in the main-scanning direction for each image forming position in the sub-scanning direction displayed on the manipulation panel 48 displays an upper magnification H1 at the upper end of an image forming region, a lower magnification H2 at the lower end, and a numerical indication button G12e which is an image imitating ten keys for setting a numerical value of a magnification in the setting instruction input region G12 as illustrated in FIG. 7. In the setting screen of the manipulation panel 48, a user can set the upper magnification H1 and the lower magnification H2 by inputting a numerical value using the numerical indication button G12e. Accordingly, the user can reflect the setting contents into the magnification information for each paper kind 321 on the determinate instruction input region G13.

Also, the setting screen for setting an image forming magnification in the main-scanning direction for each image forming position in the sub-scanning direction displayed on the manipulation panel 48 can have a construction in which the upper magnification H1 at the upper end of an image forming region, and a magnification change representing amount of change in a magnification in the main-scanning direction in a unit length of the sub-scanning direction are displayed on the setting instruction input region G12, and the values of H1 and H3 are set using the numerical indication button G12e as illustrated in FIG. 8.

The color copier 100 calculates an image forming magnification in the main-scanning direction for each image forming position in the sub-scanning direction by performing an operation based on a value set through the manipulation panel 48 using the CPU 35.

Here, the operation of the image forming magnification in the main-scanning direction for each image forming position in the sub-scanning direction, performed by the CPU 35 is described below. Also, as a definition when data are output, magnifications such as the upper magnification H1, and the lower magnification H2 set from the manipulation panel 48 are treated as a value obtained by subtracting "1" corresponding to a general status (magnification of 1×) from a given magnification. That is, in case of magnifying a general status 1.01 times, a magnification becomes 0.01.

Image forming magnifications in the main-scanning direction at the upper end and the lower end of the image forming region are the upper magnification Hi and the lower magnification H2, respectively. The total number of lines in the sub-scanning direction, which is a set value stored in the ROM is Height, and a magnification in the main-scanning direction of an N-th line in the sub-scanning direction is H(N). H(N) can be expressed in terms of a linear function. That is, in the case where an image forming region has a trapezoidal shape whose upper end is an upper magnification H1 and whose lower end is a lower magnification H2, H(N) can be obtained using Equation below.

$$H(N)=\{\text{upper magnification H1}*(\text{Height}-N)+\text{lower magnification H2}* N\}/\text{Height}=\text{upper magnification H1}+\text{magnification change H3}* N$$

where magnification change H3=(lower magnification H2−upper magnification H1)/Height.

Also, performing a magnification in the main-scanning direction corresponding to a position in the sub-scanning direction is not sufficient. For example, in the case where an image is formed from the left end, which is one end in the main-scanning direction, the image becomes a trapezoid asymmetric bilaterally. Therefore, to form an image having bilateral symmetry, a shift in the main-scanning direction corresponding to a sub-scanning position needs to be performed independently of a magnification in the main-scanning direction. A shift amount Shift(N) of an N-th line, which is data for this, can be obtained using Equation below.

$$\text{Shift}(N)=(\text{the number of lines in sub-scanning direction})\times(\text{change in line width in main-scanning direction})\times N/2$$

where (change in line width in main-scanning direction)=magnification change H3×(the number of lines in main-scanning direction)

Figure 9:
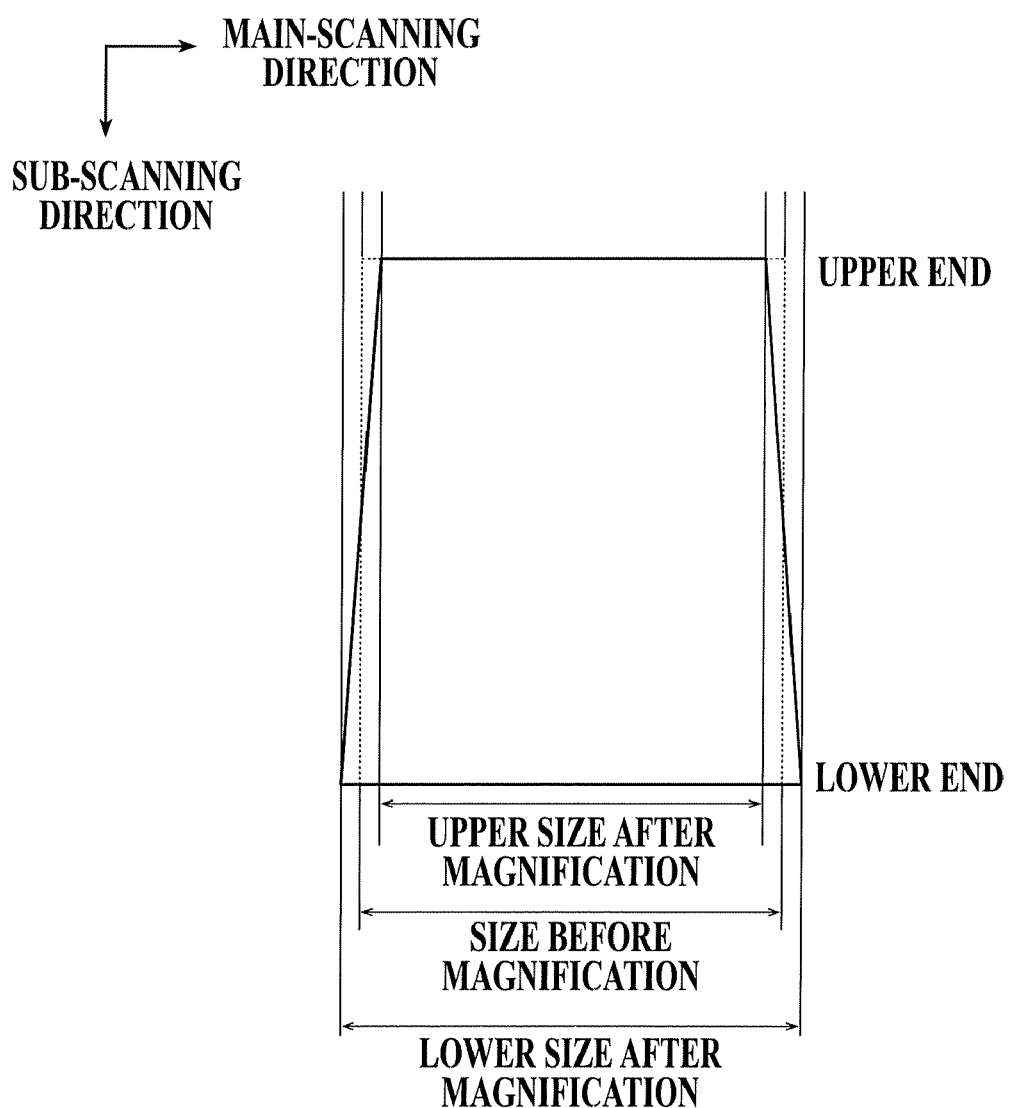
FIG. 9 is a conceptual view exemplifying a paper transformed in a trapezoidal shape.

The color copier 100 can calculate an image forming magnification in the main-scanning direction for each image forming position in the sub-scanning direction, or a shift amount in the main-scanning direction for each image forming position in the sub-scanning direction in order to perform image forming depending on a trapezoidal paper where the lengths of the upper and lower ends in the sub-scanning direction are different from each other with respect to a general status as illustrated in FIG. 9 by performing an operation on the basis of a set value of the manipulation panel 48 using the CPU 35.

Figure 10:
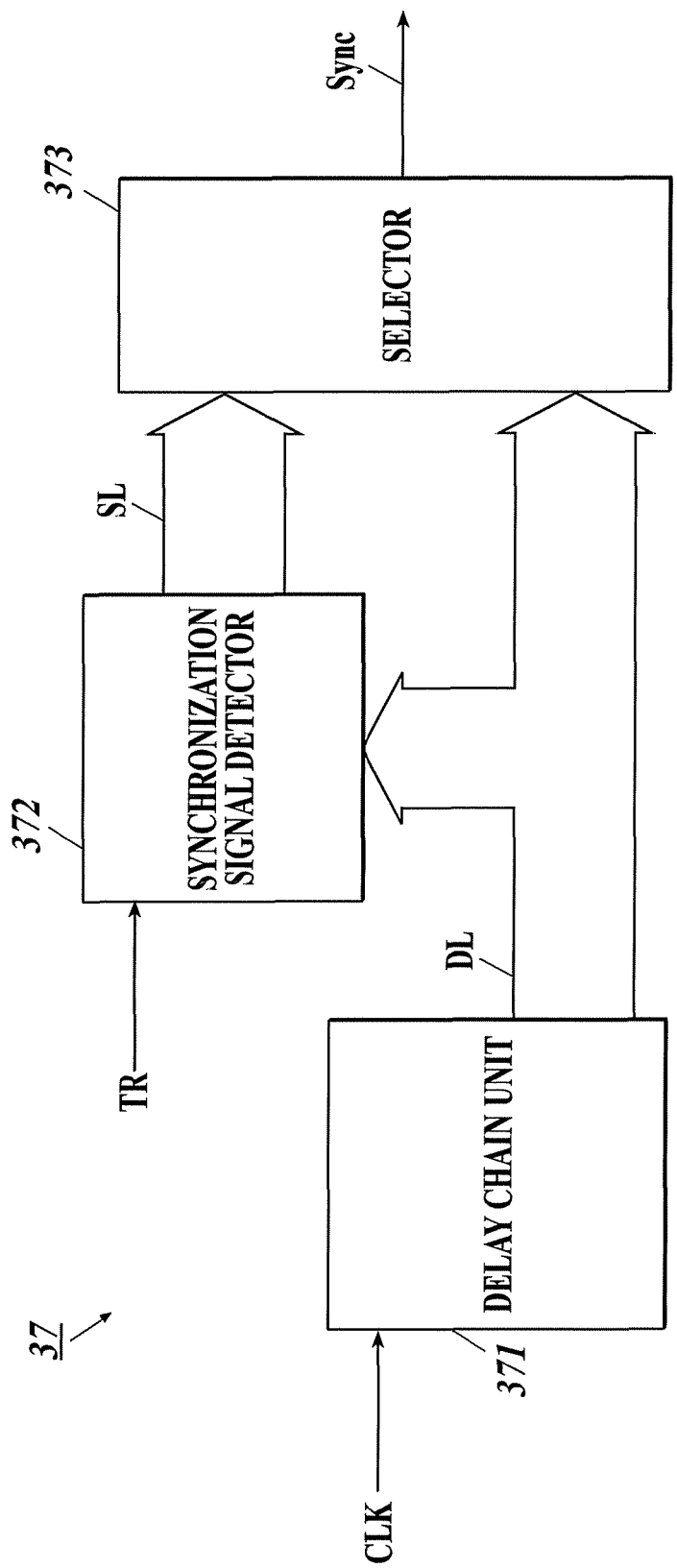
FIG. 10 is a schematic block diagram illustrating the construction of a signal generator.
Figure 12A:
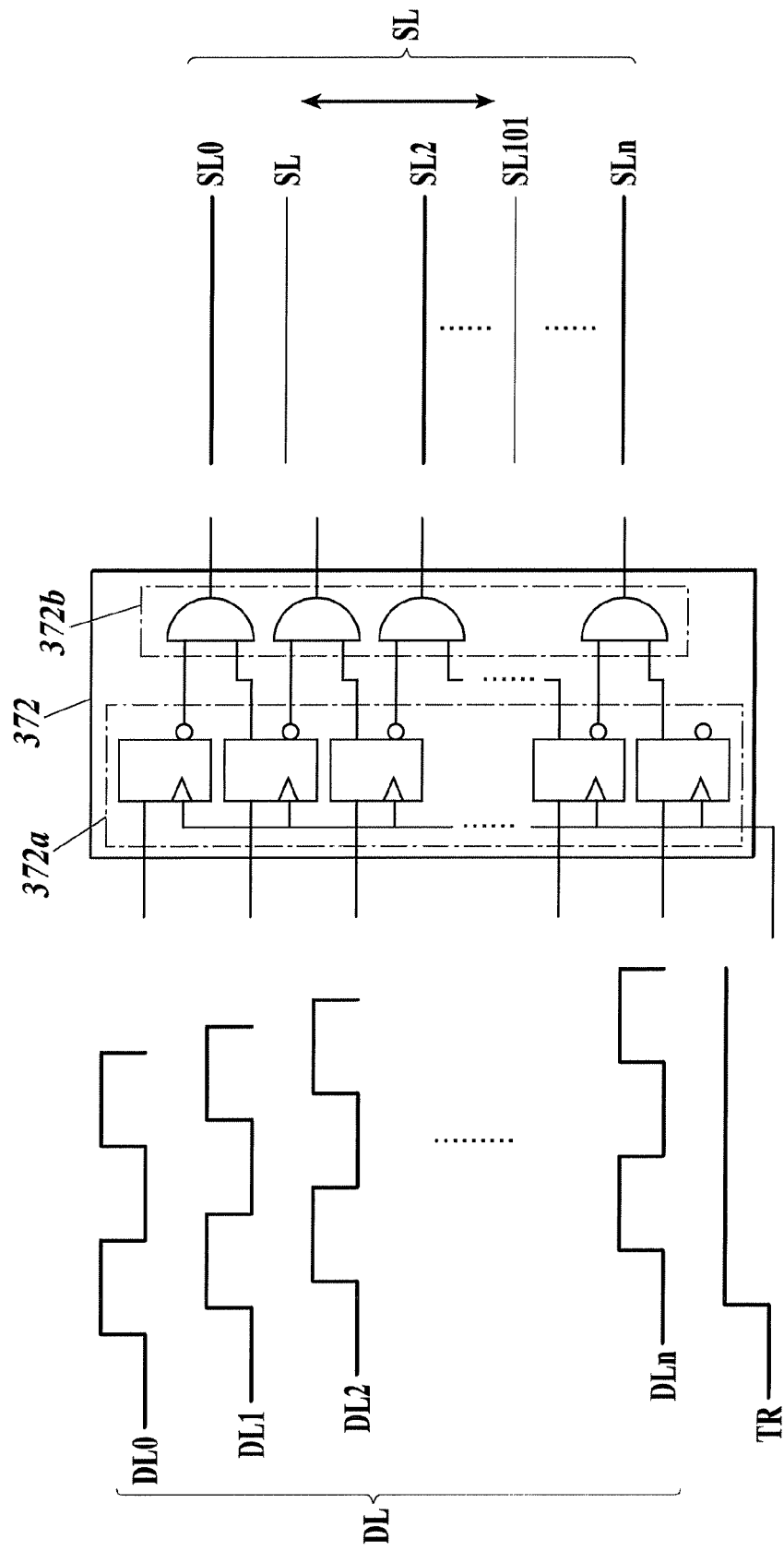
FIG. 12A is a conceptual view illustrating the construction of a synchronization signal detector and the outline of input/output signals.
Figure 12B:
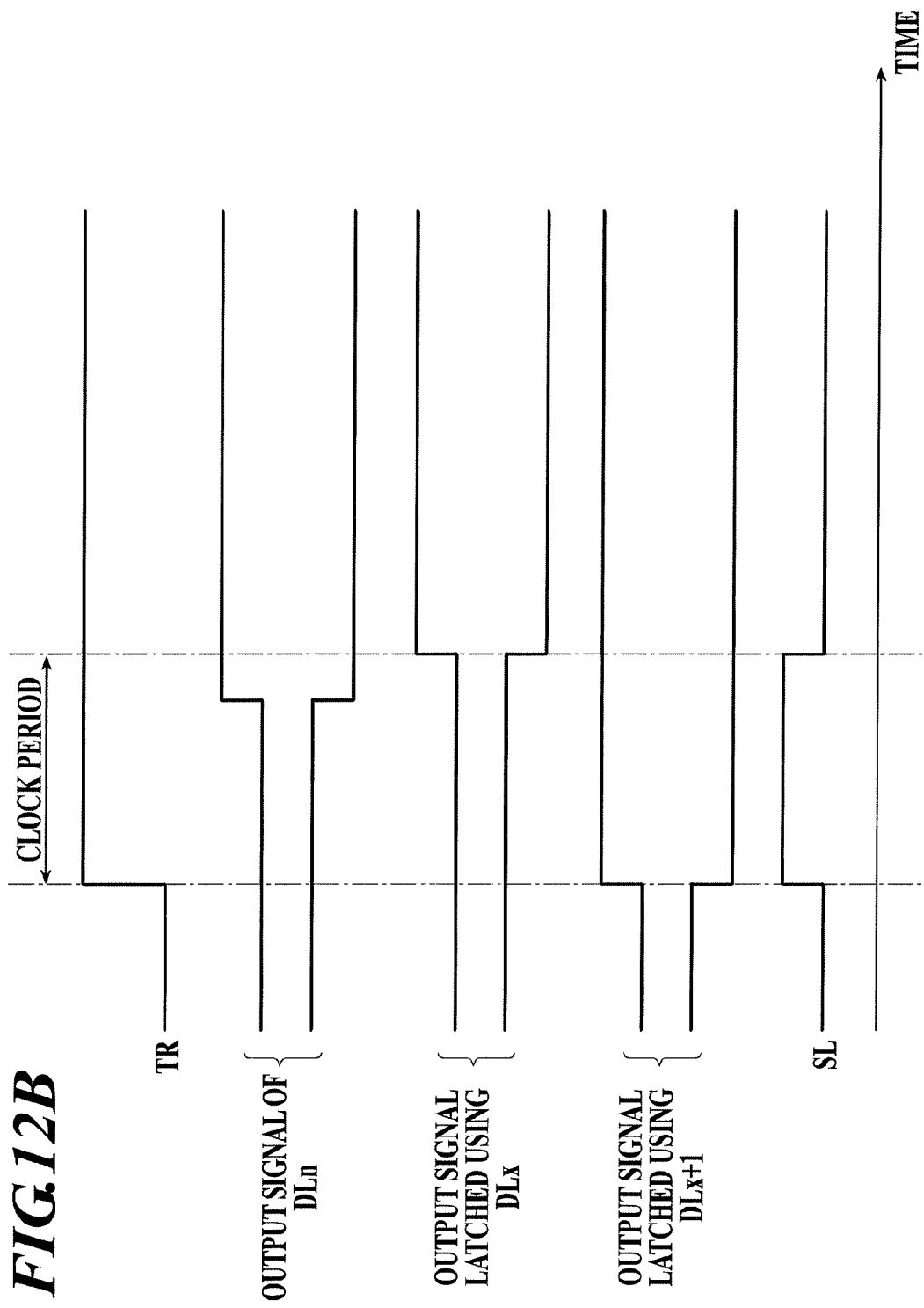
FIG. 12B is a timing chart of input/output signals.

Next, the signal generator 37 generating a clock signal under control of the controller 15 is described in detail with reference to FIGS. 10 to 14. FIG. 10 schematically illustrates the construction of the signal generator 37, FIG. 11 illustrates the construction of a delay chain unit 371 and the outline of input/output signals, and FIG. 12 illustrates the construction of a synchronization signal detector 372 and the outline of input/output signals. FIG. 12A is a conceptual view illustrating the construction of a synchronization signal detector 372 and the outline of input/output signals, and FIG. 12B is a timing chart of input/output signals. FIG. 13 illustrates the construction of a selector 373 and the outline of input/output signals. FIG. 14 illustrates a timing chart of a signal associated with the signal generator 37.

As illustrated in FIG. 10, the signal generator 37 includes the delay chain unit 371, the synchronization signal detector 372, and the selector 373. The signal generator 37 is formed inside a gate array of a complementary metal oxide semiconductor (CMOS) or an embedded cell base, and formed in full digital inside the same chip.

The delay chain unit 371 receives a clock signal CLK of a unique frequency output from the controller 15 and outputs a delay signal group DL. The synchronization signal detector 372 receives a timing signal TR included in a timing generation control signal S6 output from the delay signal group DL and the controller 15 to output a select signal SL. The selector 373 receives a delay signal group DL and a select signal SL to output a synchronization clock signal Sync associated with forming in the main-scanning direction.

As illustrated in FIG. 11, the delay chain unit 371 includes inverters 371a, 371b, . . . 371n connected in series. A signal is output every predetermined number of inverters. Therefore, the delay chain unit 371 can output delay signals DL0, . . . DLn having different phases, respectively, as a delay signal group DL with respect to an input clock signal CLK. Also, the delay chain unit 371 can include other elements excluding the above inverter, but needs to connect an inversion device so as not to destroy the waveform (duty) of an input signal.

As illustrated in FIG. 12A, the synchronization signal detector 372 includes a flip-flop group 372a and a logic and circuit group 372b. A timing signal TR is input to one end of a plurality of flip-flops in the flip-flop group 372a, and delay signals DL1, . . . DLn from the delay chain unit 371 are input to the other end of each flip-flop. In the logic and circuit group 372b, logic and circuits each receiving a positive terminal of a flip-flop in the flip-flop group 372a, and a negative terminal of an adjacent flip-flop are connected, and output select signals SL1, . . . SLn. Therefore, the synchronization signal detector 372 can receive the delay signal group DL obtained by the delay chain unit 371 and the timing signal TR, and detect a delay signal having a specific relation with the timing signal TR among the delay signal group DL from the output of the select signals SL1, . . . SLn. In other words, the synchronization signal detector 372 detects a status of the delay signal group DL using the timing signal TR as a reference, and outputs the information thereof as a select signal SL.

The color copier 100 can obtain the number of stages required for delaying one period by detecting a phase relation between the period of the delay signal group DL and the timing signal TR through the synchronization signal detector 372, and obtaining a difference in the number of stages of an output (for example, select signal SL101) of the delay signal group DL whose phase coincides with that of a second time of timing signal TR from an output (for example, select signal SL1) of the delay signal group DL whose phase coincides with that of a first time of timing signal TR, under control of the controller 15. Therefore, the color copier 100 can know a delay amount per stage of the delay chain unit 371 at a point at which the timing signal TR is input using the number of stages required for delaying the period, and a time of one period, and outputs this information as a select signal SL.

For example, as illustrated in FIG. 12B, the select signal SL is a signal that can be High only when a delay signal $DL_x$ having an edge right before a timing signal TR and a delay signal $DL_{x+1}$ having an edge right after the timing signal TR are continuous (that is, AND output of delay signal $DL_x$ and delay signal $DL_{x+1}$).

As illustrated in FIG. 13, the selector 373 can select a desired delay signal group DL on the basis of select signals SL1, . . . SLn through a plurality of logic and circuits, and output the selected delay signal group DL as a synchronization clock signal Sync. For example, the selector 373 outputs a delay signal DL1 selected by a select signal SL1 as a synchronization clock signal Sync.

Therefore, the color copier 100 can control the frequency and period of a synchronization clock signal Sync by allowing the selector 373 to select a delay signal using select signals SL1, . . . SLn on the basis of the output of the delay signal group DL whose phase coincides with that of the first time of timing signal TR, the output of the delay signal group DL whose phase coincides with that of the second time of timing signal TR, and the number of stages required for delaying one period under control of the controller 15.

Specifically, as illustrated in FIG. 14, the color copier 100 can obtain a synchronization clock signal Sync of a period T2 by selecting a desired delay signal from delay signals DL0, . . . DLn output and separated by a delay time TDL from a clock signal CLK of a period T1.

For example, as illustrated in FIG. 14, it is possible to obtain a synchronization clock signal Sync having a period which is short by 2× delay time TDL with respect to one period of a clock signal CLK by separating selected delay signals by one stage as in a delay signal DLn-1, which is a first fall, a delay signal DLn-2, which is the next rise, and a delay signal DLn-3, which is the next fall.

Also, in this case, the frequency f of a synchronization clock signal Sync is given by Equation below.

$$f = 1/(\text{one period of clock signal } CLK - 2 \times \text{delay time } TDL)$$
$$= (\text{one period of clock signal } CLK)/$$
$$(\text{one period of clock signal } CLK - 2 \times \text{delay time } TDL) \times$$
$$\text{frequency of clock signal } CLK$$

Also, the signal generator 37 can have a construction using a general phase-locked loop. It is preferable that the signal generator 37 has the full digital circuit construction in an aspect of a response characteristic to a control instruction from the controller 15. Particularly, in case of changing a magnification in the main-scanning direction for each position in the sub-scanning direction, since frequency modulation can be swiftly performed using the full digital circuit construction, an image forming time can be reduced.

Figure 15:
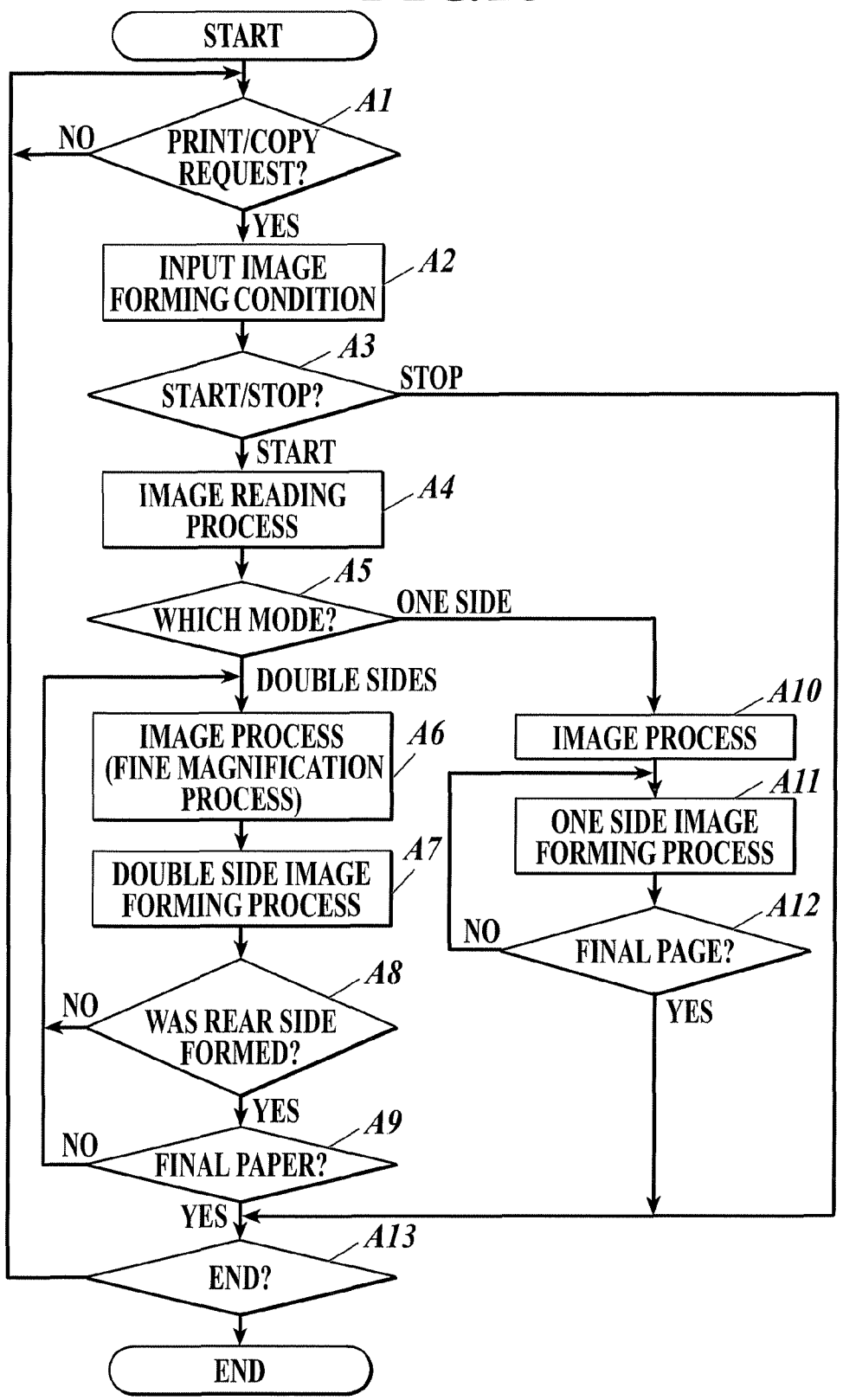
FIG. 15 is a flowchart exemplifying the operation of a color copier.
Figure 16:
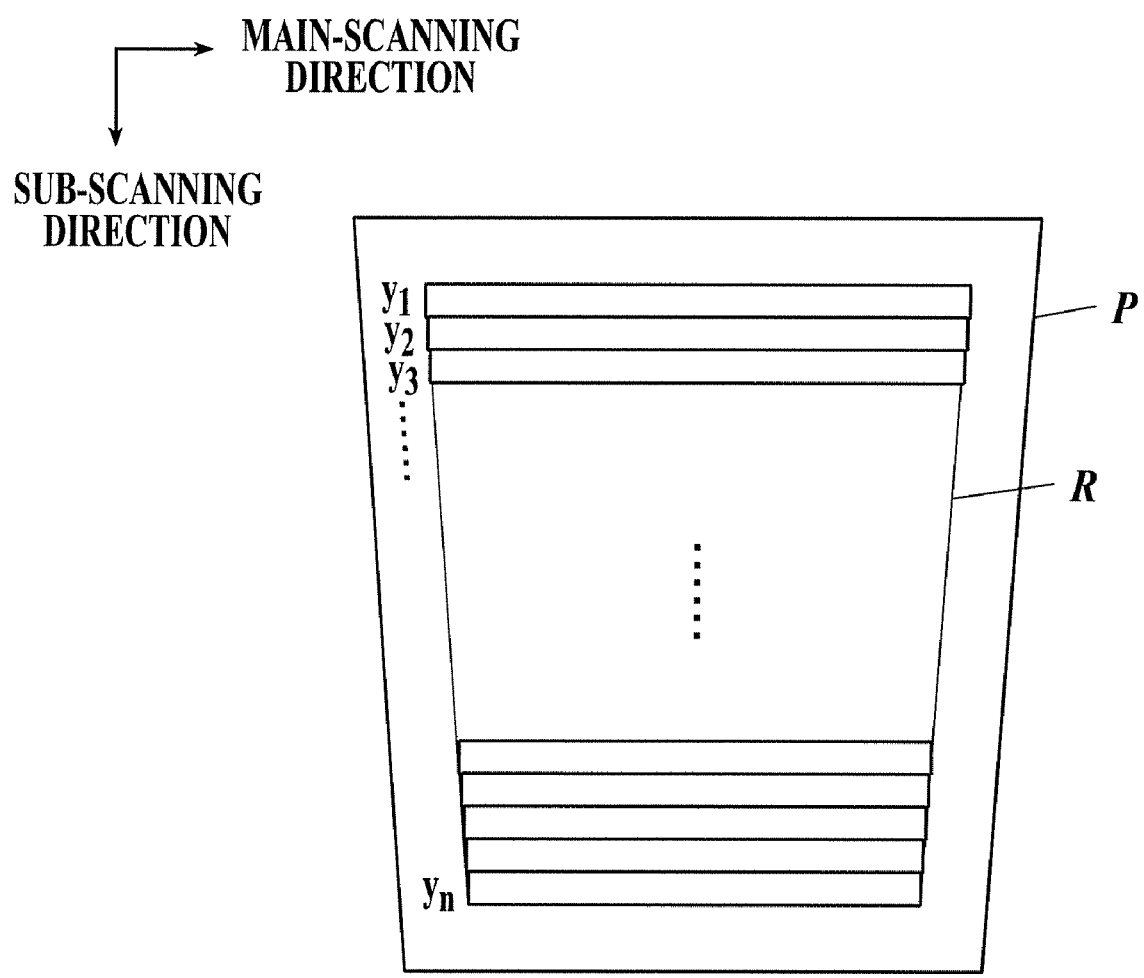
FIG. 16 is a conceptual view exemplifying an image formed on a paper.

Next, the operation of the color copier 100 controlled by the controller 15 (image forming) is described with reference to FIGS. 15 and 16. FIG. 15 is a flowchart illustrating the operation of the color copier 100 sequentially performed and executed by the controller 15. FIG. 16 exemplifies an image formed on a paper P.

As illustrated in FIG. 15, the controller 15 determines whether there exists a print requirement from a different computer through the communication unit 19, or an image forming requirement such as a print/copy by a manipulation instruction from the manipulation panel 48 (step A1). When there does not (N) exist the requirement in the determination, the controller 15 stands-by performance to the next process.

When the image forming requirement is made (Y in step A1), the controller 15 receives an input of an image forming condition associated with the requirement on the basis of communication through the communication unit 19 or an input manipulation of the manipulation panel 48, and stores the information in the magnification information for each paper kind 321 (step A2). Also, the input of the image forming condition in step A2 includes setting at the manipulation panel 48. Also, since a process on the basis of the print/copy requirement is approximately the same, and only difference is that an image read process is included in the process based on the copy requirement, only the process regarding the copy requirement is described below and description of the print requirement is not repeated.

Subsequently, the controller 15 determines which one of start/stop of a process has been instructed from the manipulation panel 48 (step A3), performs an image read process reading an image from the image input unit 11 (step A4) when the start is instructed, and determines which mode has been instructed from a double side mode and one side mode (step A5).

When the double side mode has been determined in step A5, the controller 15 performs an image process including an operation of an image forming magnification in the main-scanning direction for each image forming position in the sub-scanning direction, or an operation of a shift amount in the main-scanning direction for each image forming position in the sub-scanning direction on each image forming side (front side/rear side) of a paper P on the basis of data set to the magnification information for each paper kind 321 by the manipulation panel 48 (step A6).

Subsequently, the controller 15 performs image forming to each of the front/rear sides of the paper using an image shape based on the setting of the manipulation panel 48 by controlling the period/frequency of a clock signal associated with image forming in the main-scanning direction output from the signal generator 37 to the write unit 3 on the basis of the operation result in step A6, and a timing of an image making control signal S4 output to the RAM 34 (step A7).

Specifically, the controller 15 controls a magnification of an image to be formed in the main-scanning direction by controlling a clock signal associated with image forming in the main-scanning direction on the basis of an image forming magnification in the main-scanning direction for each image forming position in the sub-scanning direction. Also, the controller 15 shifts a timing of an image making control signal S4 output to the RAM 34 on the basis of a shift amount in the main-scanning direction. That is, the controller 15 performs a shift in the main-scanning direction by shifting a timing at which a pixel is formed.

Subsequently, the controller 15 performs a process of determining image forming onto a rear side (step A8), a process of determining whether to perform image forming up to a final page (step A9), and performs image forming onto a front side and a rear side up to a final page to determine whether to end such as whether there exists an instruction as to the next process (step A13).

Also, when the one side mode is determined in step A5, the controller 15 performs the same process as step A6 on the basis of the contents of the magnification information for each paper kind 321 set in step A2 (step A10), and performs image forming on one side (only front side or rear side) of the paper in an image shape based on the setting of the manipulation panel 48 (step A11). Subsequently, the controller 15 determines image forming to a final page (step A12) to perform image forming onto one side up to the final page, and determines whether to end such as whether there exists an instruction as to the next process (step A13).

As described above, the color copier 100 includes the signal generator 37 generating a clock signal associated with image forming in the main-scanning direction, the image forming unit 60 including the write unit 3 performing image forming in the main-scanning direction on a paper relatively moving in the sub-scanning direction in synchronization with the clock signal generated by the signal generator 37, an image processor 31 converting input image data into data for driving the write unit 3, the manipulation panel 48 setting a magnification of an image in the main-scanning direction associated with the position of the image in the sub-scanning direction to be used when the image is formed on the paper, and the controller 15 controlling to generate a clock signal of a frequency corresponding to the relative position in the sub-scanning direction on the basis a magnification set by the manipulation panel 48 when the write unit 3 performs image forming on the basis of the data for driving converted by the image processor 31.

With this construction, the color copier 100 can control a magnification of an image to be formed in the main-scanning direction for each position of a paper in the sub-scanning direction, and form an image. Therefore, when a paper is deformed in a trapezoidal shape due to thermal fixing, the color copier 100 can perform image forming reflecting the deformation of the paper, so that image deterioration due to thermal shrinkage can be prevented.

Specifically, even when a paper is deformed in a trapezoidal shape where the length in the main-scanning direction is different depending on a position in the sub-scanning direction as illustrated in FIG. 16, a magnification is properly set, so that an image can be formed in lines y1, . . . yn in the main-scanning direction corresponding to the positions of the image in the sub-scanning direction, and thus the image can be formed in an image forming region R suited for a paper deformed in a trapezoidal shape.

Also, in the color copier 100, the manipulation panel 48 sets a first magnification (for example, upper magnification), which is a magnification of an image in the main-scanning direction at one position of the image in the sub-scanning direction, and a second magnification (for example, lower magnification), which is a magnification of the image in the main-scanning direction at another position of the image in the sub-scanning direction. The controller 15 calculates magnifications of the image in the main-scanning direction with respect to a plurality of positions of the image in the sub-scanning direction on the basis of the set first and second magnifications, and controls image forming on the basis of the calculated magnifications.

With this construction, the color copier 100 can set a magnification of an image in the main-scanning direction in association with the position of the image in the sub-scanning direction when forming the image on a paper by only setting the first and second magnifications. Therefore, the color copier 100 can form the image with controlled magnifications in the main-scanning direction at the position in the sub-scanning direction.

For example, in the case where the color copier 100 designates a trapezoidal shape parallel to the main-scanning direction as an image shape to be formed, magnifications in the main-scanning direction corresponding to the positions of the sub-scanning direction can be easily set by only setting the upper and lower magnifications.

Also, in the color copier 100, the manipulation panel 48 sets a magnification (for example, upper magnification) of an image in the main-scanning direction at a position of the image in the sub-scanning direction, and amount of change in a magnification in the main-scanning direction corresponding to amount of change in a position of the image in the sub-scanning direction. The controller 15 calculates magnifications of the image in the main-scanning direction with respect to a plurality of positions of the image in the sub-scanning direction on the basis of the set magnification and change in the magnification in the main-scanning direction, and controls image forming on the basis of the calculated magnifications.

With this construction, the color copier 100 can set a magnification of an image in the main-scanning direction in association with the position of the image in the sub-scanning direction when forming the image on a paper by only setting the magnification and the amount of change in the magnification in the main-scanning direction. Therefore, the color copier 100 can form the image with controlled magnifications in the main-scanning direction at the position in the sub-scanning direction.

For example, in the case where the color copier 100 designates a trapezoidal shape parallel to the main-scanning direction as an image shape to be formed, magnifications in the main-scanning direction corresponding to the positions of the sub-scanning direction can be easily set by only setting one magnification in the main-scanning direction such as an upper magnification, and the amount of change in the magnification per 1 cm.

Also, the color copier 100 can set a magnification of an image in the main-scanning direction in association with the position of the image in the sub-scanning direction when forming an image on a paper by receiving a setting input from an operator through the setting unit 14.

Also, the color copier 100 includes the memory unit 32 storing the magnification information for each paper kind 321, which is table data storing set contents of the manipulation panel 48 for each set item (kind of paper, paper tray, image forming side (rear side/front side)). The color copier 100 reads information of the magnification information for each paper kind 321 to set a magnification of an image in the main-scanning direction associated with the position of the image in the sub-scanning direction to be used when the image is formed on a paper. Accordingly, the color copier 100 can set a magnification of an image in the main-scanning direction associated with the position of the image in the sub-scanning direction for each kind of paper, each paper tray, or each image forming side when forming the image.

Also, a description of the embodiments is exemplary embodiment and not limited thereto. The construction and operation of the above embodiments can be suitably modified.

For example, the color copier 100 according to the above embodiments performs a data calculation process for calculating a magnification of an image in the main-scanning direction in association with the position of the sub-scanning direction in an image forming side of a paper P using a linear function for increase/decrease in the magnification, but a quadratic function or an exponential function can be used and a function is not limited specifically.

The entire disclosure of Japanese Patent Applications No. 2008-012643 filed on Jan. 23, 2008 including specifications, claims, drawings and summaries are incorporated herein by reference in their entirety.

What is claimed is:

1. An image forming apparatus comprising:
a signal generator generating a clock signal associated with image forming in a main-scanning direction;
an image forming unit including a write unit performing the image forming in the main-scanning direction on a paper relatively moving in a sub-scanning direction, in synchronization with the clock signal generated at the signal generator;
an image processor converting input image data into data for driving the write unit;
a magnification setting unit setting a magnification of an image in the main-scanning direction associated with a position of the image in the sub-scanning direction to be used when the image is formed on the paper; and
a controller controlling to generate the clock signal of a frequency corresponding to a relative position in the sub-scanning direction on the basis of the magnification set at the magnification setting unit when the write unit performs the image forming on the basis of the data for driving converted at the image processor.

2. The image forming apparatus according to claim 1, wherein the magnification setting unit sets a first magnification, which is a magnification of the image in the main-scanning direction on one position of the image in the sub-scanning direction, and a second magnification, which is a magnification of the image in the main-scanning direction on another position of the image in the sub-scanning direction, and the controller calculates magnifications of the image in the main-scanning direction with respect to a plurality of positions of the image in the sub-scanning direction on the basis of the first and second magnifications set at the magnification setting unit, and performs a control operation on the basis of the calculated magnifications.

3. The image forming apparatus according to claim 1, wherein the magnification setting unit sets a magnification of the image in the main-scanning direction on one position of the image in the sub-scanning direction, and amount of change in the magnification corresponding to amount of change in the position of the image in the sub-scanning direction, and the controller calculates magnifications of the image in the main-scanning direction with respect to a plurality of positions of the image in the sub-scanning direction on the basis of the magnification and the amount of change in the magnification set at the magnification setting unit, and performs a control operation on the basis of the calculated magnifications.

4. The image forming apparatus according to claim 1, further comprising a setting unit receiving a setting input from an operator, and wherein the setting at the magnification setting unit is performed on the basis of the setting input from the setting unit.

5. The image forming apparatus according to claim 1, further comprising a first memory unit storing setting information for each kind of paper, and wherein the setting at the magnification setting unit is performed by reading setting for each kind of paper from the first memory unit.

6. The image forming apparatus according to claim 1, further comprising:
a conveying unit conveying a paper from a plurality of paper trays to the write unit; and
a second memory unit storing setting information for each of the plurality of paper trays, and wherein the setting at the magnification setting unit is performed by reading setting for each paper tray from the second memory unit.

7. The image forming apparatus according to claim 1, further comprising a third memory unit storing setting information of each image forming side of the paper, and wherein the setting at the magnification setting unit is performed by reading setting for each image forming side from the third memory unit.

8. An image forming method in an image forming apparatus comprising a signal generator generating a clock signal associated with image forming in a main-scanning direction, and a write unit performing image forming in the main-scanning direction on a paper relatively moving in a sub-scanning direction, in synchronization with the clock signal generated at the signal generator, the method comprising:
setting a magnification of an image in the main-scanning direction associated with a position of the image in the sub-scanning direction to be used when the image is formed on the paper; and generating the clock signal of a frequency corresponding to a relative position in the sub-scanning direction on the basis of the set magnification when performing, at the write unit, the image forming to perform the image forming.

9. The method according to claim 8, further comprising:

setting a first magnification, which is a magnification of the image in the main-scanning direction on one position of the image in the sub-scanning direction, and a second magnification, which is a magnification in the main-scanning direction of the image on another position of the image in the sub-scanning direction;

calculating magnifications of the image in the main-scanning direction with respect to a plurality of positions of the image in the sub-scanning direction on the basis of the set first and second magnifications; and performing the image forming on the basis of the calculated magnifications.

10. The method according to claim 8, further comprising:

setting a magnification of the image in the main-scanning direction on one position of the image in the sub-scanning direction, and amount of change in the magnification corresponding to amount of change in the position of the image in the sub-scanning direction;

calculating magnifications of the image in the main-scanning direction with respect to a plurality of positions of the image in the sub-scanning direction on the basis of the set magnification and the set change in the magnification; and performing the image forming on the basis of the calculated magnifications.

11. The method according to claim 8, wherein the image forming apparatus further comprises a setting unit receiving a setting input from an operator, and the setting is performed on the basis of the setting input from the setting unit.

12. The method according to claim 8, wherein the image forming apparatus further comprises a first memory unit storing setting information for each kind of paper, and the setting is performed by reading setting for each kind of paper from the first memory unit.

13. The method according to claim 8, wherein the image forming apparatus further comprises:

a conveying unit conveying a paper from a plurality of paper trays to the write unit; and a second memory unit storing setting information of each of the plurality of paper trays, and the setting is performed by reading setting of each paper tray from the second memory unit.

14. The method according to claim 8, wherein the image forming apparatus further comprises a third memory unit storing setting information for each image forming side of the paper, and the setting is performed by reading setting of each image forming side from the third memory unit.

* * * * *